United States Patent
Minematsu et al.

(10) Patent No.: US 11,824,993 B2
(45) Date of Patent: Nov. 21, 2023

(54) MAC TAG LIST GENERATION APPARATUS, MAC TAG LIST VERIFICATION APPARATUS, METHOD, AND PROGRAM

(71) Applicant: NEC Corporation, Tokyo (JP)

(72) Inventors: Kazuhiko Minematsu, Tokyo (JP); Norifumi Kamiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 117 days.

(21) Appl. No.: 17/601,136

(22) PCT Filed: Apr. 18, 2019

(86) PCT No.: PCT/JP2019/016582
§ 371 (c)(1),
(2) Date: Oct. 4, 2021

(87) PCT Pub. No.: WO2020/213114
PCT Pub. Date: Oct. 22, 2020

(65) Prior Publication Data
US 2022/0173909 A1 Jun. 2, 2022

(51) Int. Cl.
*H04L 9/32* (2006.01)
*H04L 9/06* (2006.01)

(52) U.S. Cl.
CPC .......... *H04L 9/3242* (2013.01); *H04L 9/0618* (2013.01); *H04L 9/0662* (2013.01)

(58) Field of Classification Search
CPC ............................ H04L 9/3242; H04L 9/0643
See application file for complete search history.

(56) References Cited

U.S. PATENT DOCUMENTS 8,577,032 B2 * 11/2013 Minematsu ........... H04L 9/0618
380/46
9,794,062 B2 * 10/2017 Hars .................... H04L 9/0631
(Continued)

FOREIGN PATENT DOCUMENTS

JP 2017-073716 A 4/2017
JP 2018-093363 A 6/2018
(Continued)

OTHER PUBLICATIONS

International Search Report for PCT Application No. PCT/JP2019/016582, dated Jul. 9, 2019.
(Continued)

*Primary Examiner* — Ponnoreay Pich
(74) *Attorney, Agent, or Firm* — Sughrue Mion, PLLC

(57) ABSTRACT

A MAC tag list generation apparatus includes: a message input part; a group testing matrix generation part which generates a t×m group testing matrix H that is a parameter(s) of combinatorial group testing with respect to the number s (s being a positive integer) of the MACs to be generated, a decodable linear group testing MAC application part which, with respect to the message M, using the group testing matrix H, a variable-length-input fixed-length-output pseudorandom function F; and a Tweakable block cipher G for which a row index of the group testing matrix H is a Tweak, generates a MAC tag list T=(T[1], . . . , T[t]); and a MAC tag list output part which outputs the MAC tag list.

18 Claims, 11 Drawing Sheets

(56) References Cited

U.S. PATENT DOCUMENTS

| | | | |
|---|---|---|---|
| 2006/0285684 A1* | 12/2006 | Rogaway | H04L 9/0637 380/37 |
| 2018/0013550 A1* | 1/2018 | Minematsu | H04L 9/088 |
| 2018/0241544 A1 | 8/2018 | Naito | |
| 2020/0076609 A1 | 3/2020 | Minematsu | |
| 2022/0173909 A1* | 6/2022 | Minematsu | H04L 9/0662 |

FOREIGN PATENT DOCUMENTS

| | | |
|---|---|---|
| WO | 2016/063512 A1 | 4/2016 |
| WO | 2016/067524 A1 | 5/2016 |
| WO | 2017/056150 A1 | 4/2017 |
| WO | 2018/193507 A1 | 10/2018 |

OTHER PUBLICATIONS

Morris Dworkin, "Recommendation for Block Cipher Modes of Operation: The CMAC Mode for Authentication", NIST Special Publication 800-38B, (May 2005).

M. Bellare, R. Canetti, H. Krawczyk, "Keying hash functions for message authentication", CRYPTO 1996, pp. 1-19, Springer, Heidelberg (Jun. 1996).

Michael T. Goodrich, Mikhail J. Atallah, Roberto Tamassia, "Indexing Information for Data Forensics", Applied Cryptography and Network Security, Third International Conference, ACNS 2005, New York, NY, USA, Jun. 7-10, 2005, Proceedings. 2005 Lecture Notes in Computer Science ISBN 3-540-26223-7, pp. 206-221.

Kazuhiko Minematsu, "Efficient Message Authentication Codes with Combinational Group Testing", ESORICS 2015. Lecture Notes in Computer Science, vol. 9326. ISBN 978-3-319-24174-6.

Giovanni Di Crescenzo, Shaoquan Jiang, Reihaneh Safavi-Naini, "Corruption-Localizing Hashing", Computer security—ESORICS 2009, 14th European Symposium on Research in Computer security, Saint-Malo, France, Sep. 21-23, 2009. Proceedings. Springer 2009 Lecture Notes in Computer Science ISBN 978-3-642-04443-4, pp. 489-504.

Ely Porat, Amir Rothschild, "Explicit Non-adaptive Combinational Group Testing Schemes" ICALP 2008:Automata, Languages and Programming pp. 748-759.

Shoichi Hirose and Junji Shikata, "Non-adaptive Group-Testing Aggregate MAC Scheme", ISPEC 2018, IACR ePrint 2018/448., Internet <URL:https://eprint.iacr.org/2018/448>.

Mihir Bellare, Roch Guerin and Phillip Rogaway, "XOR MACs: New Methods for Message Authentication Using Finite Pseudorandom Functions", CRYPTO '95, LNCS 963, pp. 15-28, 1995.

Anthony Macula, "A simple construction of d-disjunct matrices with certain constant weights", Discrete Mathematics 162 (1996) p. 311-312.

Moses Liskov and Ronald L. Rivest and David A. Wagner, "Tweakable Block Ciphers", CRYPTO 2002, Lecture Notes in Computer Science 2442, pp. 31-46, Springer 2002.

Phillip Rogaway, "Efficient Instantiations of Tweakable Blockciphers and Refinements to Modes OCB and PMAC", ASIACRYPT 2004, LNCS 3329, Springer 2004.

Christof Beierle, Jeremy Jean, Stefan Kolbl, Gregor Leander, Amir Moradi, Thomas Peyrin, Yu Sasaki, Pascal Sasdrich and Siang Meng Sim, "The SKINNY Family of Block Ciphers and Its Low-Latency Variant MANTIS", CRYPTO 2016, pp. 123-153, LNCS 9815, Springer 2016.

* cited by examiner

MAC TAG LIST GENERATION APPARATUS, MAC TAG LIST VERIFICATION APPARATUS, METHOD, AND PROGRAM

This application is a National Stage Entry of PCT/JP2019/016582 filed on Apr. 18, 2019, the contents of all of which are incorporated herein by reference, in their entirety.

FIELD

The present invention relates to a MAC tag list generation apparatus, a MAC tag list verification apparatus, a MAC tag list generation method, a MAC tag list verification method, and a program.

BACKGROUND

A Message Authentication Code (hereinafter, simply referred to "message authentication" or "MAC") is a technology which guarantees that a message is legitimate by adding a tag which can only be calculated by those who know a secret key to the message. For example, if the message authentication is used, it is possible to detect tampering done by a third party during communication between two parties which share a secret key. Concretely, when a sender sends a message and a tag to a recipient, it is possible to judge whether or not the message has been sent from the legitimate sender by calculating a tag from a received message at the recipient side and verifying that it matches the received tag. This tag is called an "authentication tag" or a "MAC tag".

Basic input and output of MAC will be described. Supposing that two parties, Alice and Bob, share a secret key K, and Alice sends a message M to Bob. In this case, Alice applies a MAC function using K, MAC_K, to M, calculates an authentication tag T=MAC_K(M), and sends (M,T) to Bob.

Supposing that information received by Bob is (M', T'), Bob determines whether or not the message has sent from Alice by verifying that T' matches MAC_K(M'). By verifying that T' matches MAC_K(M'), it is possible to know that the received message (M', T') is a pair of (a message, an authentication tag) which has originally been sent by Alice, whereby presence or absence of tampering can be checked.

As an example of such message authentication scheme, there are [CMAC] of Non-Patent Literature (NPL) 1 and [HMAC] of NPL 2.

When common message authentication is used, it is not possible to acquire information about a location(s) at which tampering has been made in a message. This is because when tampering has performed, a value of the authentication tag becomes a random value different from a correct value.

In contrast, instead of applying a MAC function to a whole message at once, it becomes possible to completely identify a location(s) of tampering in a message by dividing a message into arbitrary parts and applying a MAC function to the parts respectively, because it becomes possible to check the respective parts. For example, supposing that a message M is made up by m items M[1], ..., M[m], T[1]=MAC_K(M[1]), T[2]=MAC_K(M[2]), ..., T[m]=MAC_K(M[m]) are respectively calculated. Then, a set of the message and the authentication tags (M, T[1], ..., T[m]) may be sent.

An example of this method is to calculate MAC for each file or each disk sector for data on a hard disk. However, this method has a problem in that data amount to be stored is greatly increased because m tags are generated to m items.

Meanwhile, as described in NPL 3 [GAT05], there is an approach in which a message is decomposed into a plurality of partial series which are allowed to overlap with each other and also have different lengths, and MAC is applied to each partial series.

Example 1

For example, supposing that, when a message M is made up by 7 items, (M[1], M[2], ..., M[7]) are decomposed into 3 partial series,
S[1]=(M[1], M[2], M[3], M[4])
S[2]=(M[1], M[2], M[5], M[6])
S[3]=(M[1], M[3], M[5], M[7]),
and each of which MAC is applied to and three tags
T[1]=MAC(S[1]), ..., T[3]=MAC(S[3])
are calculated.

In this case, although the number of tags necessary for applying MAC to each of items is 7, it becomes possible to reduce the number of tags to 3. Furthermore, when representing a verification result of each (T[i], S[i]) at the time of verification by binary B[i] (MAC is correct if 0, tampering if 1), in a case where check result of MAC tags for the message M, at a time, is
B[1]=0,
B[2]=1,
B[3]=0,
it can be identified that M[6] is tampered. More accurately, in this example, a tampered item can be identified as long as only one arbitrary item is tampered.

More generally speaking of this characteristic, it is indicated that it is possible to identify tampered items if the number of tampered items is less or equal to a predetermined threshold value by devising a way for taking the partial series.

What kind of partial series a message M is decomposed and what kind of tampered items can be identified as a result of the test, is closely related to a combinatorial problem called combinatorial group testing (CGT), especially, non-adaptive combinatorial group testing (NCGT). Here, CGT and NCGT, respectively, stand for Combinatorial Group Testing and Non-adaptive CGT. In Non-Patent Literature (NPL) 3 [GAT05] and NPL 4 [Min 15], these tests have been studied. In CGT made up by m items and t tests, a t×m binary matrix H (here, called testing (test) matrix) is constructed and testing is performed according to H. If an element at an i-th row and a j-th column of H is 1 (one), it indicates that an j-th item is included in testing for i-th testing.

For example, when considering practical aspects such as application to a database system, it is unlikely that a doer of cheating tampers with the large number of items at once due to practical system restrictions. Therefore, by combining CGT and MAC as described above, it becomes possible to construct a database system in which, against tampering that may occur in reality, a location(s) thereof can be identified while suppressing the total number of tags. Please note that as with a normal MAC, when CGT and MAC are combined, with respect to any tampering, property of enabling to detect a fact that there has been tampering does not change.

Please note that same effect can be expected under a premise that hash values are stored in a safe place different from that of a message even when a hash function without a key is used instead of MAC as in Corruption-localizing hash described in NPL 5 [CJS09]. Furthermore, it is generally possible to narrow down a range of tampering even if the tampered items cannot be identified.

Next, a construction method of a testing matrix will be described. When it is desired to efficiently identify at most d pieces of tampering with respect to m items, it is known that a testing matrix should satisfy a d-disjunct property.

Concretely, a fact that a t×m binary matrix H is d-disjunct means that, let a Boolean sum (bitwise logical OR) of arbitrary d columns of H be X, any one column of remaining m−d columns is not included in X.

That is, this means that when letting a row index set in which 1 (one) is set in X be I($\underline{X}$), with respect to arbitrary one column Y selected from the remaining m−d columns, I(Y) is not a subset of I(X).

With respect to the minimum number of rows t_min(d,m) of a d-disjunct matrix for given d and m (that is, the minimum number of tests which can identify tampering of at most d items), $$t\_min(d,m)=O(d^2 \log m) \quad \text{(Expression 1)}$$

is known. A method to realize this is well-known for d=1, and can be configured from a parity check matrix of a Hamming code, and so on.

For example, the above [Example 1] is such an example at m=7, and a corresponding 1-disjunct matrix becomes below.

[1 1 1 1 0 0 0]

[1 1 0 0 1 1 0]

[1 0 1 0 1 0 1]   (Expression 2)

On the other hand, although several configuration methods are known for d>1, it is generally known that it is difficult to construct an optimum method. For example, NPL 6 [PR08] is known as a method to achieve $O(d^2 \log m)$, actual efficiency including not an order but a constant is unknown. It is known that it is theoretically impossible to construct a d-disjunct matrix which is non-trivial (that is, not a unit matrix) for d which is large to an extent concerning m.

Furthermore, PTL 1 discloses a tag list generation apparatus of a message authentication code (MAC) which can acquire information not only about presence or absence of tampering but also a location(s) of tampering. According to PTL 1, it is described as below that this tag list generation apparatus includes a message input part which inputs a message made up by m (m is a positive integer) items M[1], . . . , [m], a group testing matrix generation part, and a tag list generation part. Then, the group testing matrix generation part generates an s×m group testing matrix which defines combinatorial group testing with respect to the number s (s is a positive integer) of tags of the message authentication code to be generated. Furthermore, the tag list generation part generates a tag list made up by s tags with respect to the message using the group testing matrix, a variable-length-input fixed-length-output pseudorandom function, and a fixed-length-input/output pseudorandom function with Tweak. Then, the tag list generation part performs calculation of tags respectively for m items M[1], . . . , M[m] making up the message in parallel while sharing calculation results in the course of calculation.

PTL 2 discloses an example of an authenticated encryption apparatus which can efficiently prevent an increase in band width. Furthermore, PTL 2 discloses a configuration including an initial vector generation means (fixed-length value generation part) which generates an n-bit initial vector N (fixed-length value, nonce) different from a value generated in the past (refer to FIG. 1 of PTL 2).

PTL 3 discloses an authentication tag generation apparatus which can suppress increase of calculation amount of authentication tag generation. According to PTL 3, this authentication tag generation apparatus calculates a hash function for each item of a partial series acquired by dividing an inputted message according to a group testing matrix representing combinatorial group testing concerning the message. Then, the authentication tag generation apparatus generates an authentication tag of the partial series from a value acquired by a combining operation of individual hash values by a combiner. Then, in the combiner of the authentication tag generation apparatus, the combiner performs the combining operation of the individual hash values, by using a hash value of an item of an empty series as an identity element (unity) of the operation.

Furthermore, NPL 7 [HS18] is a document which proposes that an aggregation node A acquires and sends a plurality of partial sums of tags according to a d-disjunct matrix. Furthermore, NPL 8 [BGR95] is a document that proposes a MAC function used for tag generation. Furthermore, NPL 9 [M96] is a document that introduces a method for constructing a d-disjunct matrix.

Furthermore, NPLs 10 to 12 are examples of a Tweakable block cipher having a block cipher utilizing mode using a block cipher such as AES (Advance Encryption Standard) and so on.

PTL 1: Japanese Patent Kokai Publication No. JP-2017-73716
PTL 2: WO2016/067524A1
PTL 3: WO2018/193507A1
NPL 1: [CMAC], SP 800-38B, "Recommendation for Block Cipher Modes of Operation: The CMAC Mode for Authentication", (May 2005).
NPL 2: [HMAC], M. Bellare, R, Canetti, H. Krawczyk, "Keying hash functions for message authentication", CRYPTO 1996, pp. 1-15, Springer, Heidelberg (1996).
NPL 3: [GAT05], Michael T. Goodrich, Mikhail J. Atallah, Roberto Tamassia, "Indexing Information for Data Forensics", Applied Cryptography and Network Security, Third International Conference, ACNS 2005, New York, NY, USA, Jun. 7-10, 2005, Proceedings. 2005 Lecture Notes in Computer Science ISBN 3-540-26223-7, pp. 206-221.
NPL 4: [Min 15], Kazuhiko Minematsu, "Efficient Message Authentication Codes with Combinatorial Group Testing", ESORICS 2015. Lecture Notes in Computer Science, vol 9326. ISBN 978-3-319-24174-6.
NPL 5: [CJS09], Giovanni Di Crescenzo, Shaoquan Jiang, Reihaneh Safavi-Naini, "Corruption-Localizing Hashing", Computer security—ESORICS 2009, 14th European Symposium on Research in Computer security, Saint-Malo, France, Sep. 21-23, 2009. Proceedings. Springer 2009 Lecture Notes in Computer Science ISBN 978-3-642-04443-4, pp. 489-504.
NPL 6: [PR08], Ely Porat, Amir Rothschild, "Explicit Non-adaptive Combinatorial Group Testing Schemes" ICALP (1) 2008: 748-759.
NPL 7: [HS18], Shoichi Hirose and Junji Shikata, "Non-adaptive Group-Testing Aggregate MAC Scheme", ISPEC 2018, IACR ePrint 2018/448., Internet <URL: https://eprint.iacr.org/2018/448>
NPL 8: [BGR95], Mihir Bellare, Roch Guerin and Phillip Rogaway, "XOR MACs: New Methods for Message Authentication Using Finite Pseudorandom Functions", CRYPTO '95.
NPL 9: [M96], Anthony Macula, "A simple construction of d-disjunct matrices with certain constant weights", Discrete Mathematics 162 (1996) page 311-312.

NPL 10: [LRW], Moses Liskov and Ronald L. Rivest and David A. Wagner, "Tweakable Block Ciphers", CRYPTO 2002, Lecture Notes in Computer Science 2442, Springer 2002.

NPL 11: [XEX], Phillip Rogaway, "Efficient Instantiations of Tweakable Blockciphers and Refinements to Modes OCB and PMAC", ASIACRYPT 2004, LNCS 3329, Springer 2004.

NPL 12: [SKINNY], Christof Beierle and Jeremy Jean and Stefan Kolbl and Gregor Leander and Amir Moradi and Thomas Peyrin and Yu Sasaki and Pascal Sasdrich and Siang Meng Sim, "The SKINNY Family of Block Ciphers and Its Low-Latency Variant MANTIS", CRYPTO 2016, LNCS 9815, Springer 2016.

SUMMARY

The following analysis has been given by the present invention. The first problem of the present invention is to more efficiently construct message authentication which can acquire information not only presence or absence of tampering but also a location(s) of tampering than a method of NPL 3 [GAT05] and NPL 4 [Min 15] and so on.

Concretely, in methods such as NPL 3[GAT05], NPL 4 [Min 15], and so on, according to a theory of Non-adaptive Combinatorial Group Testing (NCGT), a testing matrix used for a tag generation is directly constructed. Typically, in the methods such as NPL 3[GAT05], NPL 4 [Min 15], and so on, there is a problem that it is not possible to realize an efficient method, with respect to parameters (d and the number m of items and the number t of tests) which are difficult to construct a d-disjunct matrix, because a testing matrix is constructed by a d-disjunct matrix.

On the other hand, as described in the background, although an optimum method for constructing a matrix for the case of d=1 is well-known, an optimum method for constructing a matrix for the case of d>1 is not known, and it is also known that there exists no d-disjunct matrix which is non-trivial in the first place, that is, t<m, when d becomes large to some extent.

It is an object of the present invention to provide a MAC tag list generation apparatus, a MAC tag list verification apparatus, a MAC tag list generation method, a MAC tag list verification method, and a program which can contribute to make message authentication that can acquire information not only about presence or absence of tampering but also a location(s) of tampering more efficiently.

According to a first aspect, there is provided a MAC tag list generation apparatus, including: a message input part that inputs a message M=(M[1], . . . , M[m]) made up by m items M[1], . . . , M[m] which are targets of message authentication codes (MACs); a group testing matrix generation part which generates a t×m group testing matrix H that is a parameter(s) of combinatorial group testing with respect to the number s (s being a positive integer) of the MACs to be generated; a decodable linear group testing MAC application part; and a MAC tag list output part which outputs the MAC tag list generated by the decodable linear group testing MAC application part. Further, the decodable linear group testing MAC application part generates a MAC tag list T=(T[1], . . . , T[t]), by performing a processing, for all of i=1, . . . , t, in which, with respect to the message M, using the group testing matrix H, a variable-length-input fixed-length-output pseudorandom function F, and a Tweakable block cipher G for which a row index of the group testing matrix H is a Tweak, for all of column indexes j (j=1, . . . , m) at which elements are 1 (one) in an i-th row of the group testing matrix H, the M[j] and the index j are inputted to the pseudorandom function F, and a sum of all of acquired outputs of the pseudorandom function F is calculated to be an i-th intermediate tag S [i], and an output acquired by encrypting the intermediate tag S[i] by a Tweakable encryption function of the Tweakable block cipher G for which the i is a Tweak is to be a tag T[i] corresponding to an i-th (i=1, . . . , t) test.

According to a second aspect, there is provided a MAC tag list verification apparatus, including: a message input part that inputs a message M=(M[1], . . . , M[m]) made up by m items which are targets of MAC tag list verification using message authentication codes (MACs) and a MAC tag list T=(T[1], . . . , T[t]) which is a list of t MACs; a group testing matrix generation and expansion part which generates a t×m group testing matrix H and also outputs a testing matrix expansion rule R which is made up by subsets of a plurality of row indexes of the binary group testing matrix H; a tag decryption part which acquires an intermediate tag list S=(S[1], . . . , S[t]) by performing, for all i=1, . . . t, a processing in which a result of decrypting elements T[i] of the MAC tag list T=(T[1], . . . , T[t]) by a decryption function of a Tweakable block cipher G for which i is a Tweak becomes to be an intermediate tag S[i]; a decodable linear group testing intermediate tag generation part; an intermediate tag list expansion part; an intermediate tag list verification part; and a verification result output part which outputs the verification result outputted by the intermediate tag list verification part. Further, the decodable linear group testing intermediate tag generation part generates a verification intermediate tag list S*=(S*[1], . . . , S*[t]) by performing, for all i=1, . . . , t, a processing in which using the group testing matrix H and a variable-length-input fixed-length-output pseudorandom function F, the verification intermediate tag S*[i] corresponding to an i-th (i=1, . . . t) test is generated in such a manner that, with respect to all of column indexes j (j=1, . . . m) at which elements are 1 (one) in an i-th row of the group testing matrix H, the M[j] and the index j are inputted to the pseudorandom function F, and a sum of all of acquired outputs of F are calculated to be an i-th verification intermediate tag S*[i]. The intermediate tag list expansion part outputs an expanded intermediate tag list exS and an expanded verification intermediate tag list exS* acquired by linearly combining S and S* respectively to correspond to subsets of the row indexes designated by the testing matrix expansion rule R, using the intermediate tag list S, the verification intermediate tag list S* and the testing matrix expansion rule R. Further, the intermediate tag list verification part compares the expanded intermediate tag list exS and the expanded verification intermediate tag list exS*, verifies each item in the message M, identify a location(s) of tampering, and outputs it as a verification result.

According to a third aspect, there is provided a MAC tag list generation method, including: inputting a message M=(M[1], . . . , M[m]) made up by m items M[1], . . . , M[m] which are targets of message authentication codes (MACs); generating a t×m group testing matrix H that is a parameter(s) of combinatorial group testing with respect to the number s (s being a positive integer) of the MACs to be generated; generating a MAC tag list T=(T[1], . . . , T[t]), by performing a processing, for all of i=1, . . . , t, in which, with respect to the message M, using the group testing matrix H, a variable-length-input fixed-length-output pseudorandom function F, and a Tweakable block cipher G for which a row index of the group testing matrix H is a Tweak, for all of column indexes j (j=1, . . . , m) at which elements are 1 (one)

in an i-th row of the binary group testing matrix H, the M[j] and the index j are inputted to the pseudorandom function F, and a sum of all of acquired outputs of the pseudorandom function F is calculated to be an i-th intermediate tag S [i], and an output acquired by encrypting the intermediate tag S[i] by a Tweakable encryption function of the Tweakable block cipher G for which the i is a Tweak is to be a tag T[i] corresponding to an i-th (i=1, . . . , t) test; and outputting the MAC tag list acquired by the decodable linear group testing MAC application part. The present method is tied to a particular machine, namely, a computer which inputs a message M and outputs a MAC tag list as described above.

According to a fourth aspect, there is provided a MAC tag list verification method, including: inputting a message M=(M[1], . . . , M[m]) made up by m items which are targets of MAC tag list verification using message authentication codes (MACs) and a MAC tag list T=(T[1], . . . , T[t]) which is a list of t MACs; generating a t×m group testing matrix H and also outputting a testing matrix expansion rule R which is made up by subsets of a plurality of row indexes of the binary group testing matrix H; acquiring an intermediate tag list S=(S[1], . . . , S[t]) by performing, for all i=1, . . . t, a processing in which a result of decrypting elements T[i] of the MAC tag list T=(T[1], . . . , T[t]) by a decryption function of a Tweakable block cipher G for which i is a Tweak becomes to be an intermediate tag S[i]; generating a verification intermediate tag list S*=(S*[1], . . . , S*[t]) by performing, for all j=1, . . . , t, a processing in which, with respect to the message M, using the group testing matrix H and a variable-length-input fixed-length-output pseudorandom function F, the verification intermediate tag S*[i] corresponding to an i-th (i=1, . . . t) test is generated in such a manner that, with respect to all of column indexes j (j=1, . . . m) at which elements are 1 (one) in an i-th row of the group testing matrix H, the M[j] and the index j are inputted to the pseudorandom function F, and a sum of all of acquired outputs of F are calculated to be an i-th verification intermediate tag S*[i]; outputting an expanded intermediate tag list exS and an expanded verification intermediate tag list exS* acquired by linearly combining S and S* respectively to correspond to subsets of the row indexes designated by the testing matrix expansion rule R, using the intermediate tag list S, the verification intermediate tag list S* and the testing matrix expansion rule R; comparing the expanded intermediate tag list exS and the expanded verification intermediate tag list exS*, verifying each item in the message M, identifying a location(s) of tampering, and outputting it as a verification result; and outputting the verification result outputted by the intermediate tag list verification part. The present method is tied to a particular machine, namely, a computer which inputs a message M and a MAC tag list T and outputs a verification result as described above.

According to a fifth aspect, there is provided a computer program which realizes functions of a MAC tag list generation apparatus and a MAC tag list verification apparatus as described above. It is to be noted that this program may be recorded on a computer-readable (non-transitory) storage medium. That is to say, the present invention may be implemented as a computer program product.

According to the present invention, it becomes possible to achieve more efficient message authentication that can acquire information about not only presence or absence of tampering but also a location(s) of tampering.

PREFERRED MODES

First Example Embodiment

Next, a MAC tag list generation apparatus according to a first example embodiment of the present invention will be described in detail with reference to drawings. Hereinafter, unless otherwise noted, let a length of 1 block be n bits.

Figure 1:
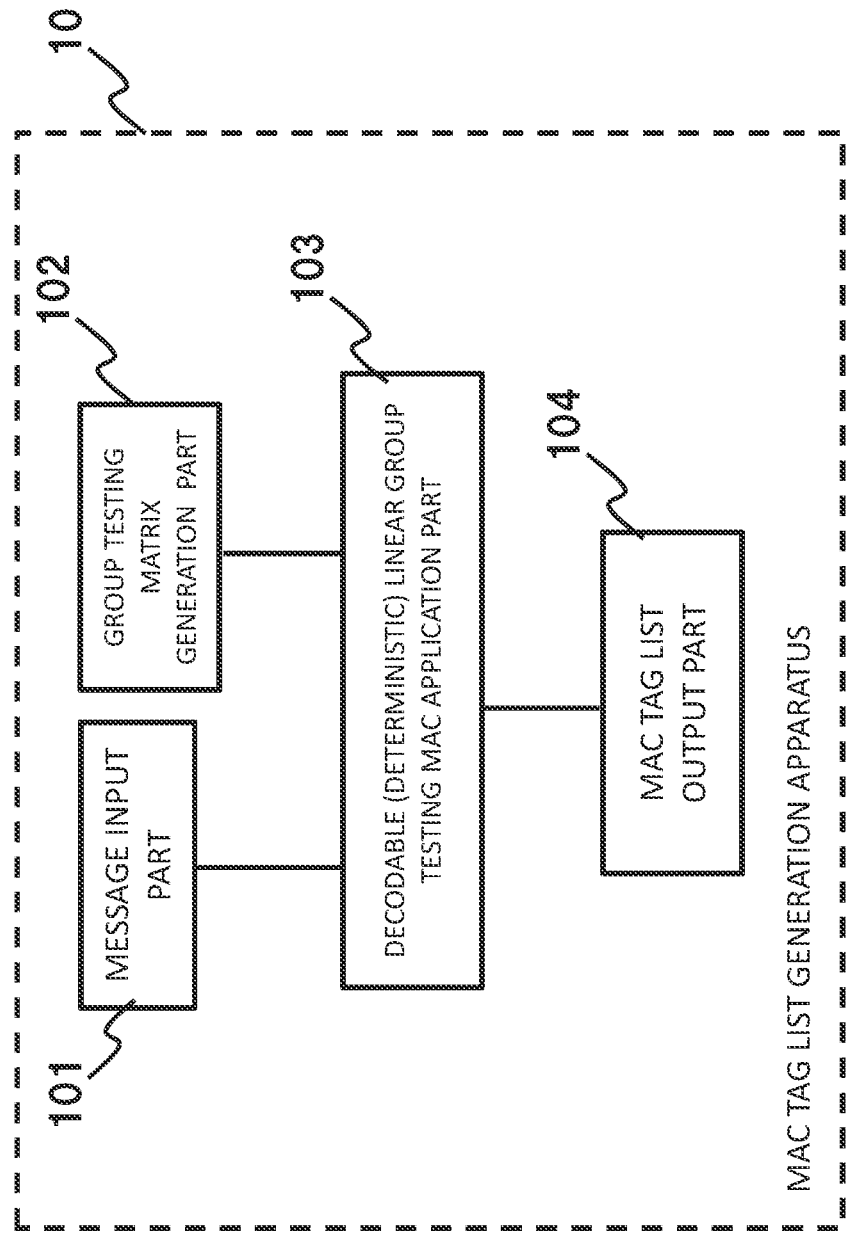
FIG. 1 is a diagram illustrating a configuration of a MAC tag list generation apparatus according to a first example embodiment of the present invention.

FIG. 1 is a diagram illustrating a configuration of a MAC tag list generation apparatus according to a first example embodiment of the present invention. With reference to FIG. 1, a MAC tag list generation apparatus 10 including a message input part 101, a group testing matrix generation part 102, a decodable (deterministic) linear group testing MAC application part 103, and a MAC tag list output part 104 is shown.

The message input part 101 is a facility which inputs a target message M. Such a message input part 101 can be realized by, for example, a character input apparatus such as a keyboard or a communication interface for receiving data from other apparatuses.

In the description below, supposing that a message M is made up by m discrete items M[1], . . . , M[m]. Each item may have a different length and may include ones having the same value. For example, each item may be contents of one sector of a hard disk, one entry of a database, or one character of sentence information.

The group testing matrix generation part 102 generates combinatorial group testing for identifying a location(s) at which tampering has been made (termed as "a location(s) of tampering"). Concretely, the group testing matrix generation part 102 generates a t×m binary matrix H according to the number of tests (that is the number of MACs) t and a maximum value d of the number of a tampered item(s) which can be identified. Although a configuration of this matrix H is arbitrary, for example, it is possible to have bases over GF(2) of an existing d-disjunct matrix D. That is, the matrix H can be said to be a matrix made up by whole linearly independent row vectors of the d-disjunct matrix D or a matrix acquired by performing basic row operations (additions of rows themselves) to whole linearly independent row vectors.

Example 2

As an example, considering a following matrix.
[1 1 0 0]
[1 0 1 0]
[0 1 1 0]
[0 1 0 1]
[0 0 1 1]

The example 2 as described above is a 6×4 matrix and a 2-disjunct. Because of 6>4, it is not appropriate as a testing matrix, that is, a trivial scheme which creates a tag for every item is superior because 4 tags are only necessary. However, because bases over GF(2) of the above matrix are
[1 0 0 1]
[0 1 0 1]
[0 0 1 1],
it is possible to identify 2 items by 3 tags.

Please note that, because, in a case where m=4 and d=2, it is known that there does not exist a non-trivial (the number of rows<the number of columns) 2-disjunct matrix, it is not possible to construct a significant scheme in NPL 3 [GAT05], NPL 4 [Min 15] and NPL 7 [HS18].

The decodable linear group testing MAC application part 103 generates t MAC tags for a message M=(M[1], ..., M[m]) with a method designated by t×m group testing matrix H.

A variable-length-input fixed-length-output pseudorandom function (PRF) F, and a Tweakable block cipher (TBC) G are used for MAC tag generation. This Tweakable block cipher G is a Tweakable block cipher G for which a row index of the matrix H is a Tweak.

The pseudorandom function F as described above can be a standard block cipher such as AES or a pseudorandom function made up by using a hash function such as SHA-2 and so on, for example CMAC or HMAC (refer to NPL 1, 2).

Furthermore, it is possible for the Tweakable block cipher G to use a block cipher utilization mode using a block cipher such as AES and so on (for example, an LRW mode of NPL 10 [LRW] and an XEX mode of NPL 11 [XEX]). Furthermore, as the Tweakable block cipher G, it is possible to use SKINNY which is specifically designed Tweakable block cipher (for example, NPL 12 [SKINNY]).

In the following description, for simplicity, it is assumed that an output length of a pseudorandom function F and a block length of a Tweakable block cipher G are equal. However, if an output length of a pseudorandom function F and a block length of a Tweakable block cipher G are different, it is possible to appropriately apply padding or shortening to outputs of a pseudorandom function F and a Tweakable block cipher G to adjust lengths thereof to be equal. Furthermore, a pseudorandom function F and a Tweakable block cipher G may be different cryptographic primitives using different keys or may be generated using an identical block cipher which uses an identical key using an appropriate key generation function or a block cipher utilization mode.

Figure 8:
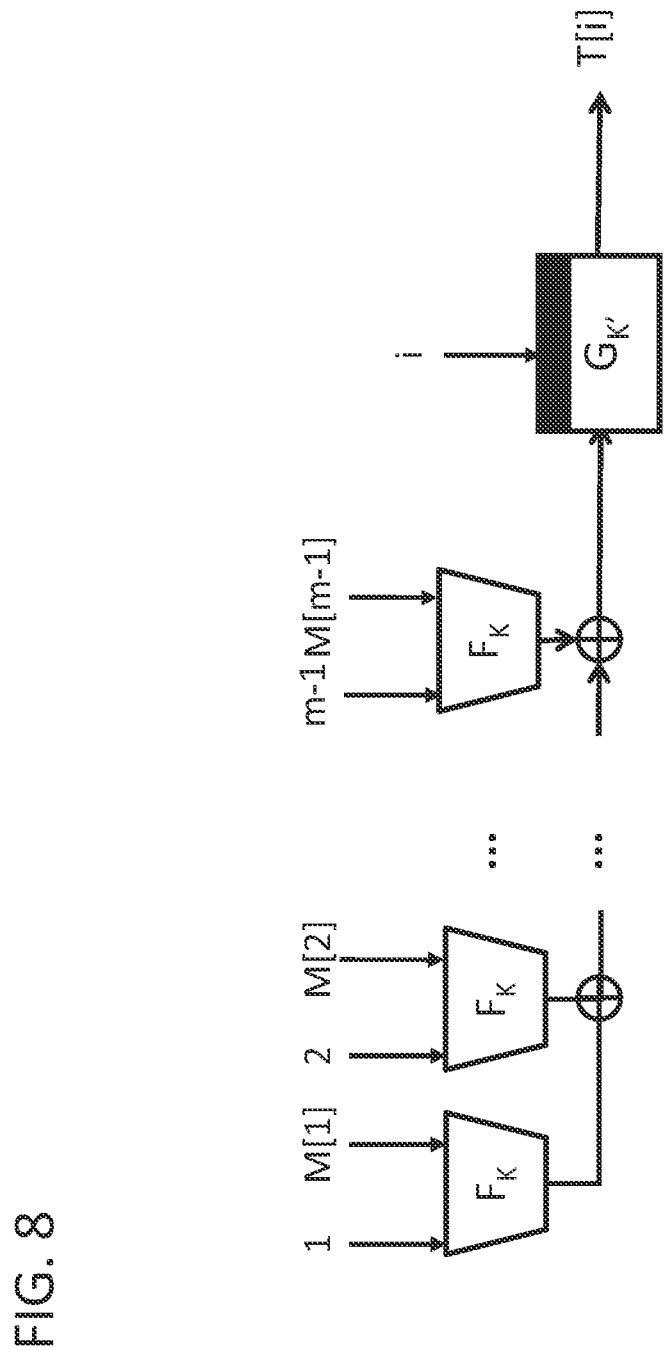
FIG. 8 is a diagram illustrating an example of a MAC function using a variable-length-input pseudorandom function F and a Tweakable block cipher G.

FIG. 8 illustrates that i-th row vector H[i] of a matrix H indicates which items are to be included in a MAC tag calculation in an i-th test. Concretely, with respect to all of the column indexes j at which elements are 1 (one) in H[i], M[j] is combined with j and inputted to F to obtain F(M[j], j). With respect to all of indexes j, a sum of all of F(M[j], j) is calculated (for example, exclusive OR). Furthermore, a value acquired by inputting the sum of all of F(M[j], j) and i to G is to be a MAC value T[i] corresponding to the i-th test.

The decodable linear group testing MAC application part 103 performs all calculations as described above for all i=1, ..., t and generates a MAC tag list T=(T[1], ... T[t]).

Figure 9:
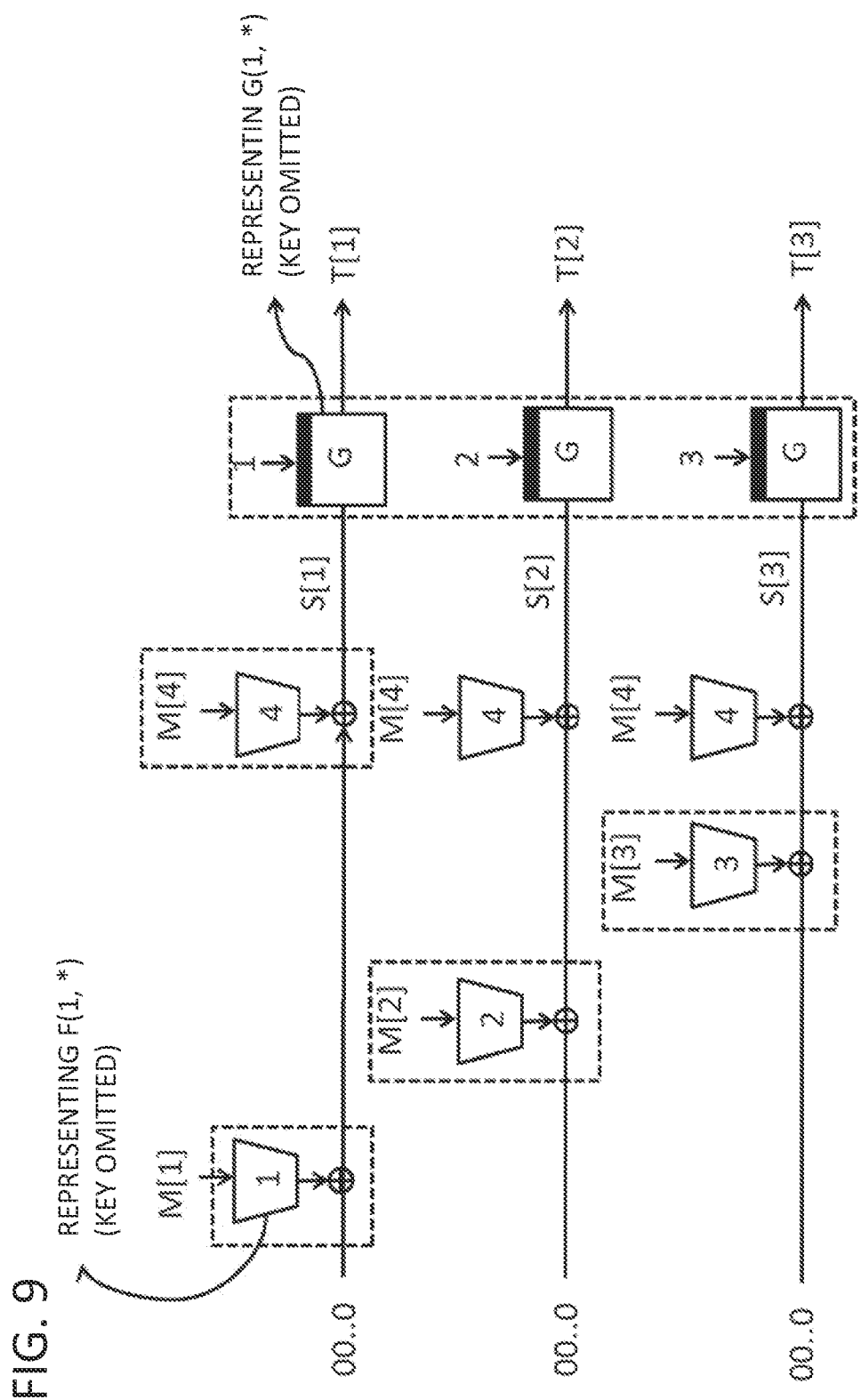
FIG. 9 is a diagram illustrating an example of a configuration to generate a MAC tag list for m=4 items and t=3 tests.
Figure 10:
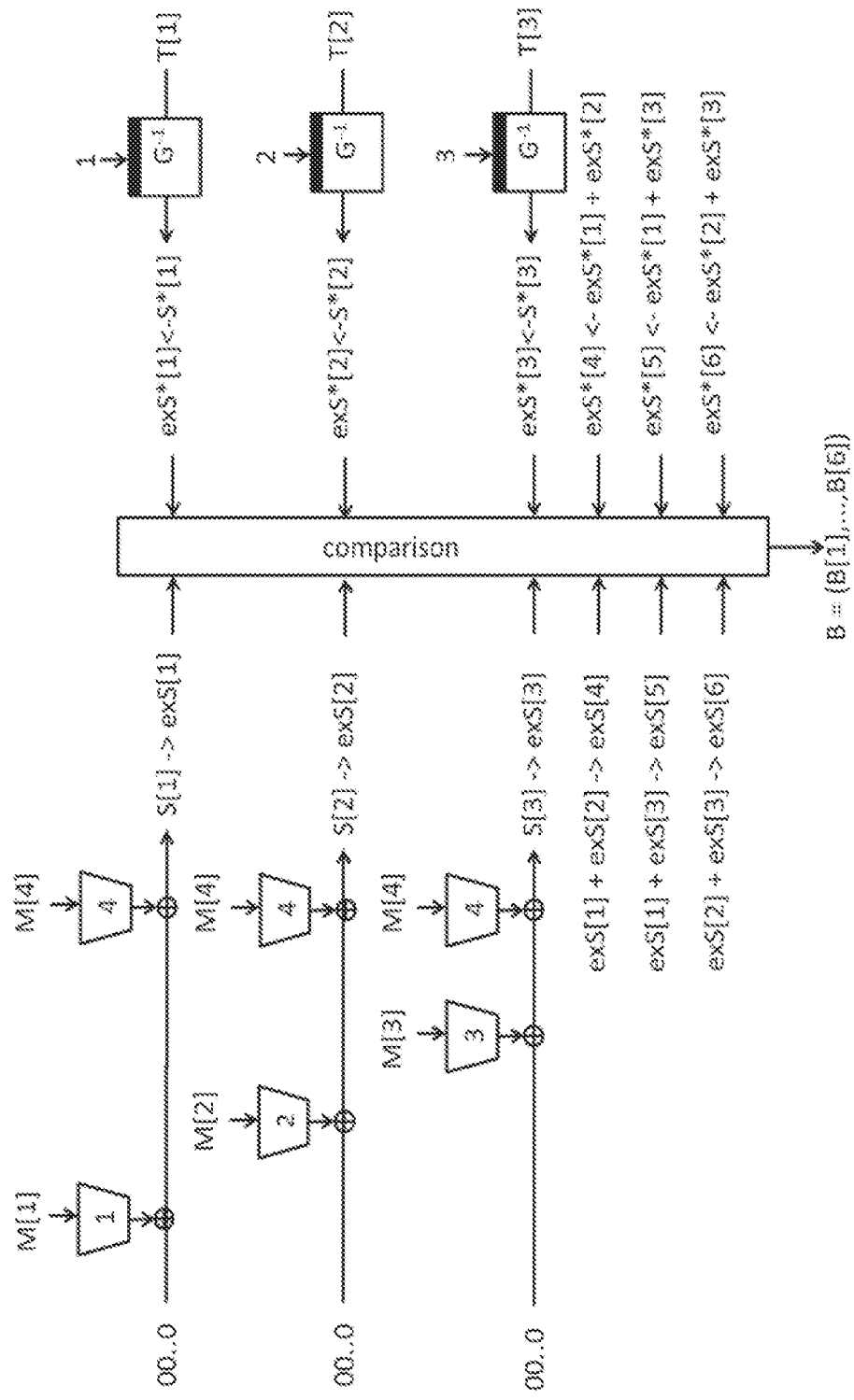
FIG. 10 is a diagram illustrating an example of a configuration to verify a MAC tag list for m=4 items and t=3 tests.

Here, calculation of each of Mac tags can be performed in an extensively efficient manner by performing in parallel while sharing calculation results in the course of calculation as the same manner as described in NPL 4 [Min 15] instead of performing individually for each test (refer to FIGS. 8 and 9). FIG. 9 illustrates an example of generation of a MAC tag list for m=4 items and t=3 tests. In the example of FIG. 9, it is possible to calculate a tag list made up by 3 tags by calculating segments surrounded by broken lines.

In the decodable linear group testing MAC as described above, it is difficult for an attacker to predict a MAC tag for an arbitrary message as long as F is a pseudorandom function and G is a secure Tweakable block cipher (Tweakable pseudorandom permutation). Therefore, MAC tag tampering is difficult.

The MAC tag list output part 104 outputs a MAC tag list outputted by the decodable linear group testing MAC application part 103 to a computer display or a printer.

Figure 11:
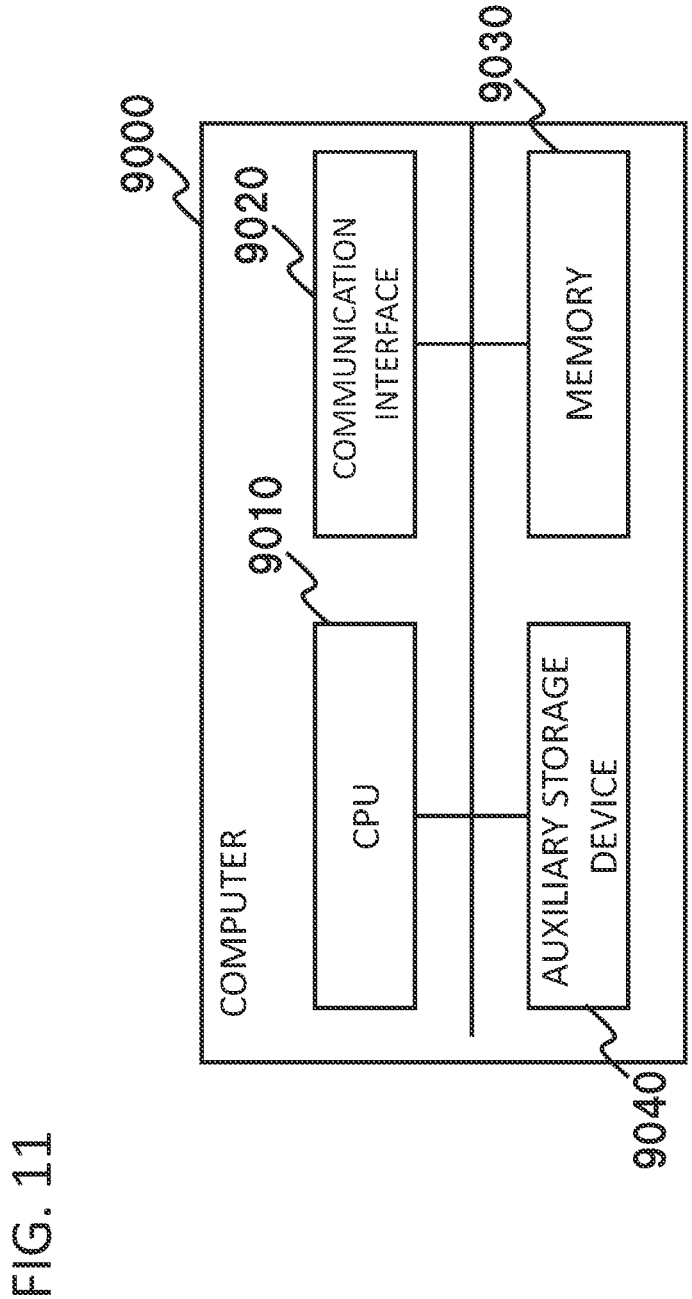
FIG. 11 is a diagram illustrating a configuration of a computer that can implement the present invention.

The MAC tag list generation apparatus 10 as described above can be realized by a CPU, a memory, and a disk. Each processing unit of the MAC tag list generation apparatus can be realized by storing a program on the disk and executing the program on the CPU (refer to FIG. 11).

Figure 2:
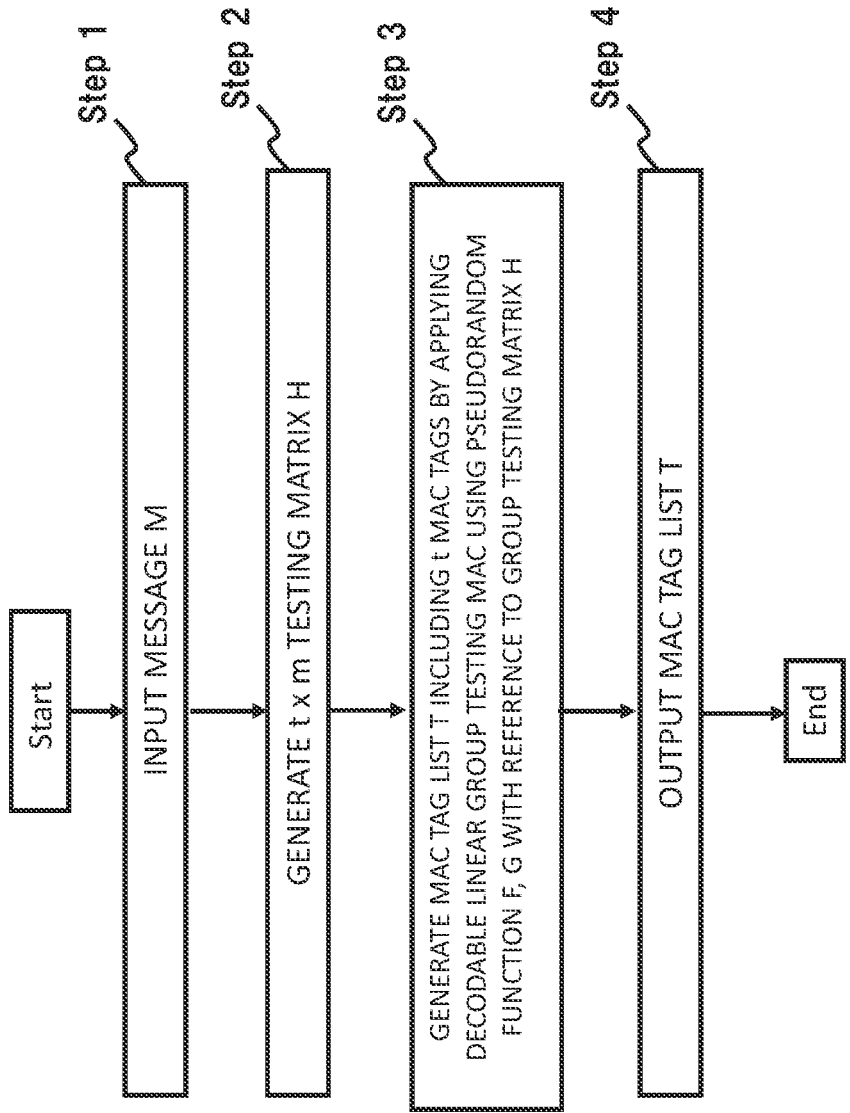
FIG. 2 is a flowchart illustrating an operation of the MAC tag list generation apparatus according to the first example embodiment of the present invention.

Next, with reference to a flow chart as shown in FIG. 2, whole operations of the first example embodiment will be described in detail. First, the message input part 101 inputs a message M made up by m items to be targets (step 1 of FIG. 2).

Next, the group testing matrix generation part 102 generates a group testing matrix H which is a t rows×m columns binary matrix (step 2 of FIG. 2).

Next, the decodable linear group testing MAC application part 103 generates a MAC tag list T made up by t MAC tags with reference to the group testing matrix H (step 3 of FIG. 2). Concretely, the t MAC tags are generated by applying decodable linear group testing MAC using a pseudorandom function F and a Tweakable block cipher G, to M.

Finally, the MAC tag list output part 104 outputs the acquired MAC tag list T (step 4 of FIG. 2).

Figure 3:
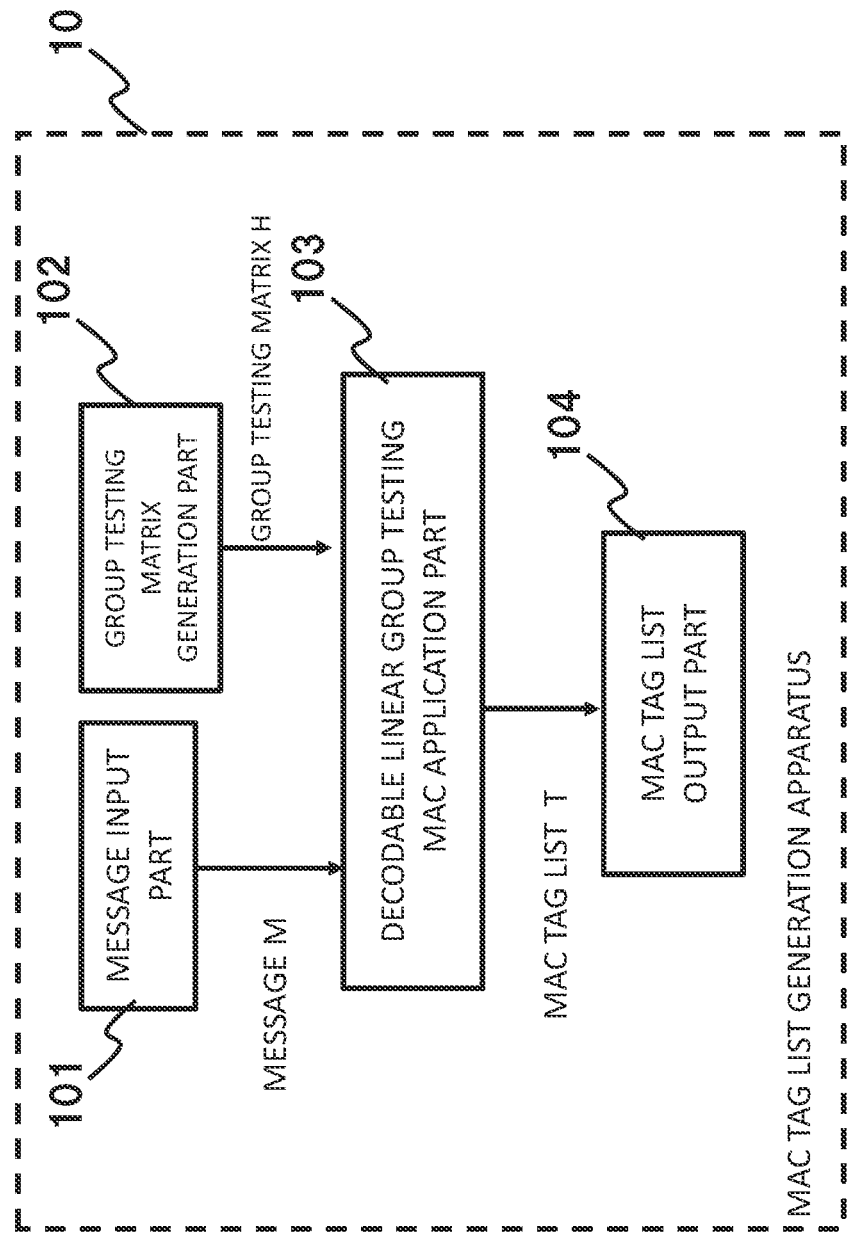
FIG. 3 is a diagram illustrating a data flow of each part of the MAC tag list generation apparatus according to the first example embodiment of the present invention.

The MAC tag list generation apparatus 10 which operates as described above can be summarized below. Hereinafter, it will be described with reference to FIG. 3.

The message input part 101 inputs a message made up by m items M[1], ..., M[m] which is a target of MAC.

The group testing matrix generation part 102, with respect to the number s of MAC to be generated, generates a t×m binary group testing matrix H which is a parameter of combinatorial group testing.

The message M and the binary group testing matrix H are inputted to the decodable linear group testing MAC application part 103.

The decodable linear group testing MAC application part 103, with respect to the message M, generates a tag T[i] corresponding to an i-th (i=1, ..., t) test, using the group testing matrix H, a variable-length-input fixed-length-output pseudorandom function F, and a Tweakable block cipher G.

Concretely, the decodable linear group testing MAC application part 103, with respect to all the column indexes j (j=1, . . . , m) at which elements are 1 (one) in an i-th row of the group testing matrix H, inputs M[j] and the index j to the pseudorandom function F. Then, the decodable linear group testing MAC application part 103 calculates a sum of all of outputs acquired by inputting to the pseudorandom function F to obtain an i-th intermediate tag S[i]. Furthermore, the decodable linear group testing MAC application part 103 encrypts the intermediate tag S[i] with the Tweakable block cipher G for which the i is a Tweak to acquire an output as a tag T[i]. The decodable linear group testing MAC application part 103 generates a MAC tag list T=(T[1], . . . T[t]) by performing calculation of an above MAC tag T[i] for all i=1, . . . , t (refer to FIGS. 8 and 9).

Then, the MAC tag list output part 104 outputs the MAC tag list T which has been acquired by the decodable linear group testing MAC application part.

Effect of the first example embodiment as described above will be described along with that of a MAC tag list verification apparatus of a second example embodiment.

Second Example Embodiment

Figure 4:
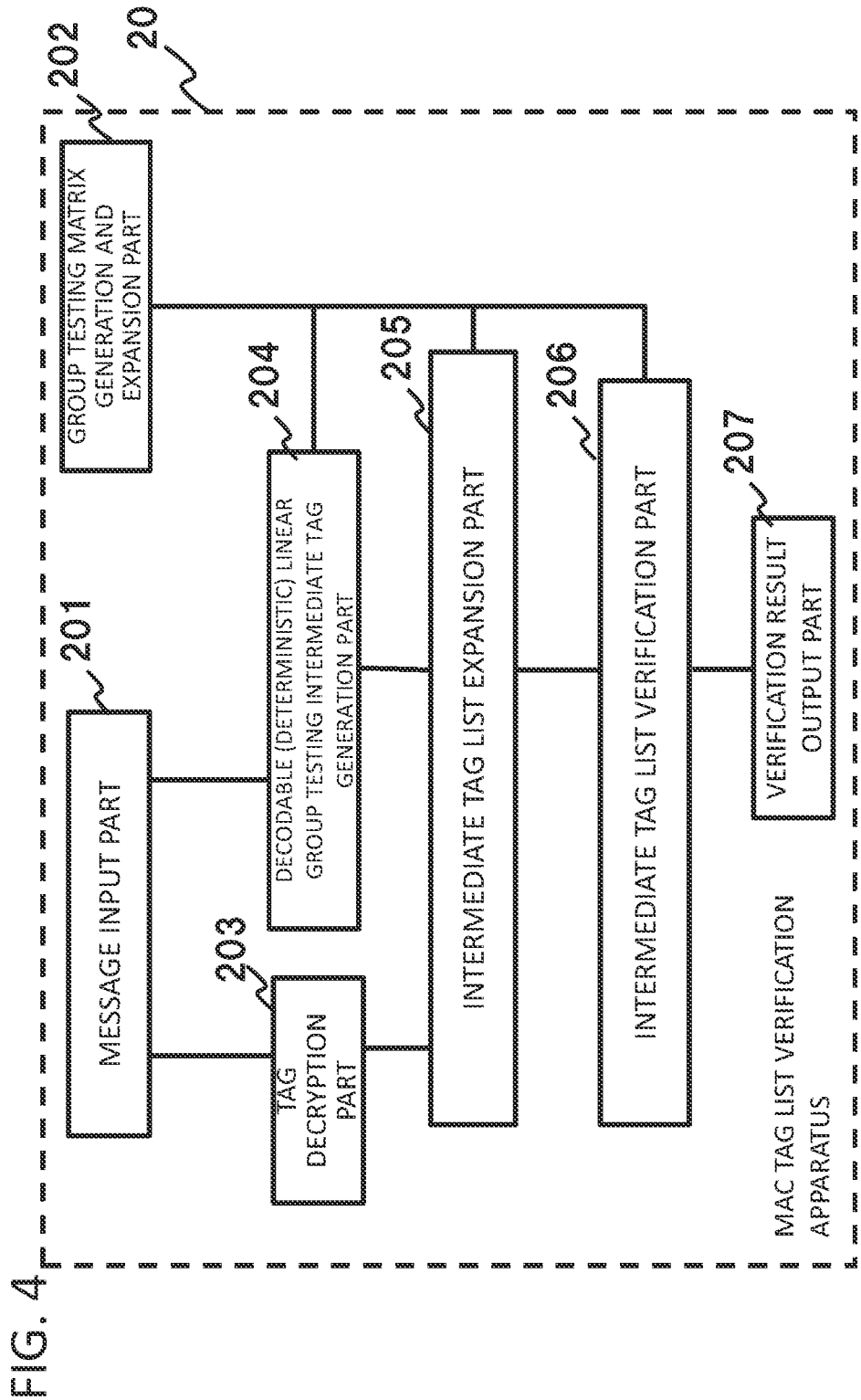
FIG. 4 is a diagram illustrating a configuration of a MAC tag list verification apparatus according to a second example embodiment of the present invention.

Next, as a second example embodiment, a MAC tag list verification apparatus forming a pair with the first example embodiment of the present invention will be described in detail with reference to the drawings. FIG. 4 is a block diagram illustrating a configuration of a MAC tag list verification apparatus according to the second example embodiment. With reference to FIG. 4, a configuration including a message input part 201, a group testing matrix generation and expansion part 202, a tag decryption part 203, a decodable (deterministic) linear group testing intermediate tag generation part 204, an intermediate tag list expansion part 205, an intermediate tag list verification part 206, and a verification result output part 207 is illustrated.

The message input part 201 is a facility to input a message M to be a target and the MAC tag list T outputted by a MAC tag list generation apparatus 10 of the first example embodiment. Such message input part 201 can be realized by, for example, a character input apparatus such as a keyboard or a communication interface for receiving data from other apparatuses.

As with the first example embodiment, here, supposing that a message M is made up by m discrete items M= M[1], . . . , M[m].

The group testing matrix generation and expansion part 202 generates the same matrix H as that generated by the group testing matrix generation part 102 of the MAC tag list generation apparatus 10 in the first example embodiment, and a testing matrix expansion rule R. The testing matrix expansion rule R is a rule required for generating a matrix having a larger number of rows, bases of which is the matrix H. Concretely, the testing matrix expansion rule R is made up by v items (where, v>t) which are subsets of row indexes of the matrix H.

The tag decryption part 203 decrypts the MAC tag list T=(T[1], . . . T[t]) respectively by a decryption function of the Tweakable block cipher G, acquires intermediate tags S[i]=G$^{-1}$(i, T[1]), and outputs an intermediate tag list S=(S [1], . . . S[t]). Please note that an encryption processing in which a Tweak of the Tweakable block cipher G is i and a plaintext is M is denoted by G(i,M) and a decryption processing in which a Tweak is i and a ciphertext is C is denoted by G$^{-1}$(i, $\underline{C}$).

The decodable linear group testing intermediate tag generation part 204 performs a processing of the decodable linear group testing MAC application part 103 of the first example embodiment without an encryption processing by G with respect to the message M and the testing matrix H and outputs a verification intermediate tag list S*= (S*[1], . . . , S*[t]).

The intermediate tag list expansion part 205 generates an expanded verification MAC tag list exS* by linearly combining and expanding elements of the verification MAC tag list S* according to the testing matrix expansion rule R.

Here, the testing matrix expansion rule R is made up by v (where v>t) elements R[1], . . . , R[v] and each R[i] is a subset of {1, . . . t}.

At this time, the expanded verification MAC tag list is denoted by exS*=(exS*[1], . . . , exS*[v]) and, for example, if R[1]={1, 2, 4}, exS*[1]=S*[1]+S*[2]+S*[4] holds.

The intermediate tag list expansion part 205 generates an expanded MAC tag list exS=(exS[1], . . . , exS[v]) by linearly combining and expanding elements of the MAC tag list T inputted from the message input part 201 and according to the testing matrix expansion rule R as well. Then, the intermediate tag list expansion part 205 outputs the expanded MAC tag list exS and the expanded verification MAC tag list exS* to the intermediate tag list verification part 206.

The intermediate tag list verification part 206 verifies the message M by comparing the expanded verification MAC tag list exS* and the expanded MAC tag list exS using the group testing matrix H and the testing matrix expansion rule R. Concretely, the intermediate tag list verification part 206 determines presence or absence of tampering to the message M using comparison between the expanded verification MAC tag list exS* and the expanded MAC tag list exS. Furthermore, if the intermediate tag list verification part 206 determines that tampering has occurred, the intermediate tag list verification part 206 identifies a tempered item(s) and outputs an index(es) thereof to the verification result output part 207.

Here, a mechanism of a message verification operation by the intermediate tag list verification part 206 will be described.

First, let a matrix which is acquired by expanding the group testing matrix H by the testing matrix expansion rule R, that is, with respect to R=(R[1], . . . , R[v]), a v (v>t)×m matrix whose i-th row is a linear combination of a row of a matrix H designated by R[i], be an expanded testing matrix exH.

Here, let i-th row of the expanded testing matrix exH be exH[i], $$exH[i]=\text{XOR}\_\{i:i\in R[i]\}H[i] \quad \text{(Expression 3)}$$

results (XOR_S is exclusive OR to all components included in a set S). Please note that it is natural to use the group testing matrix H itself as a test and in such a case, exH includes H.

This can be realized by, for example, R[i]={i} for t=1, . . . , t.

At this time, with respect to exS*=(exS*[1], . . . , exS*[v]) and exS=(exS[1], . . . , exS[v]), a difference is calculated for every entry for both. Then, a binary vector B=(B[1], . . . , B[v]) is created, in which 0 is assigned in a case where a difference is zero and 1 is assigned in a case where a difference is non-zero, and, with respect to B, a result is obtained and outputted on the basis of a predetermined procedure using the expanded testing matrix exH.

Concretely, if all the entries of B are 0, the intermediate tag list verification part 206 determines that there is no tampering, and otherwise, as a whole, determines that there is tampering in at least one item and identifies a tampered item(s). More concretely, the intermediate tag list verification part 206 takes an i-th row vector(s) $V=(V[1], \ldots, V[m])$ of exH for all $i=1, \ldots, v$ at which $B[i]=0$, and determines that there is no tampering of M[j] for all $j=1, \ldots, m$ at which $V[j]=1$ holds.

The intermediate tag list verification part 206 performs processing as described above, determines that there is(are) tampering for all item(s) other than those for which it is determined that there is no tampering, and outputs all the indexes thereof. If there is no tampering, no index is outputted.

In the group test, this procedure corresponds to a processing called a naive decoder when an expanded testing matrix exH is used as a testing matrix.

If the expanded testing matrix exH is d-disjunct, it is possible to identify all the tampered items by the procedure as described above in a case where the number of tampered items is less than or equal to d.

Furthermore, as described in NPL 5 [CJS09], because it does not yield an occurrence in which an item(s) which has(have) been determined to be not tampered has (have) actually been tampered, there is effect to narrow down the range of potential tampering in general, even if it is not d-disjunct for a desired d.

The verification result output part 207 outputs information on an index(es) of a tampered item(s) outputted from the intermediate tag list verification part 206 on a computer display or a printer, and so on.

The MAC tag list verification apparatus 20 as described above can be realized by a CPU, a memory, and a disk. Each processing unit of the MAC tag list generation apparatus can be realized by storing a program on the disk and executing the program on the CPU (refer to FIG. 11).

Figure 5:
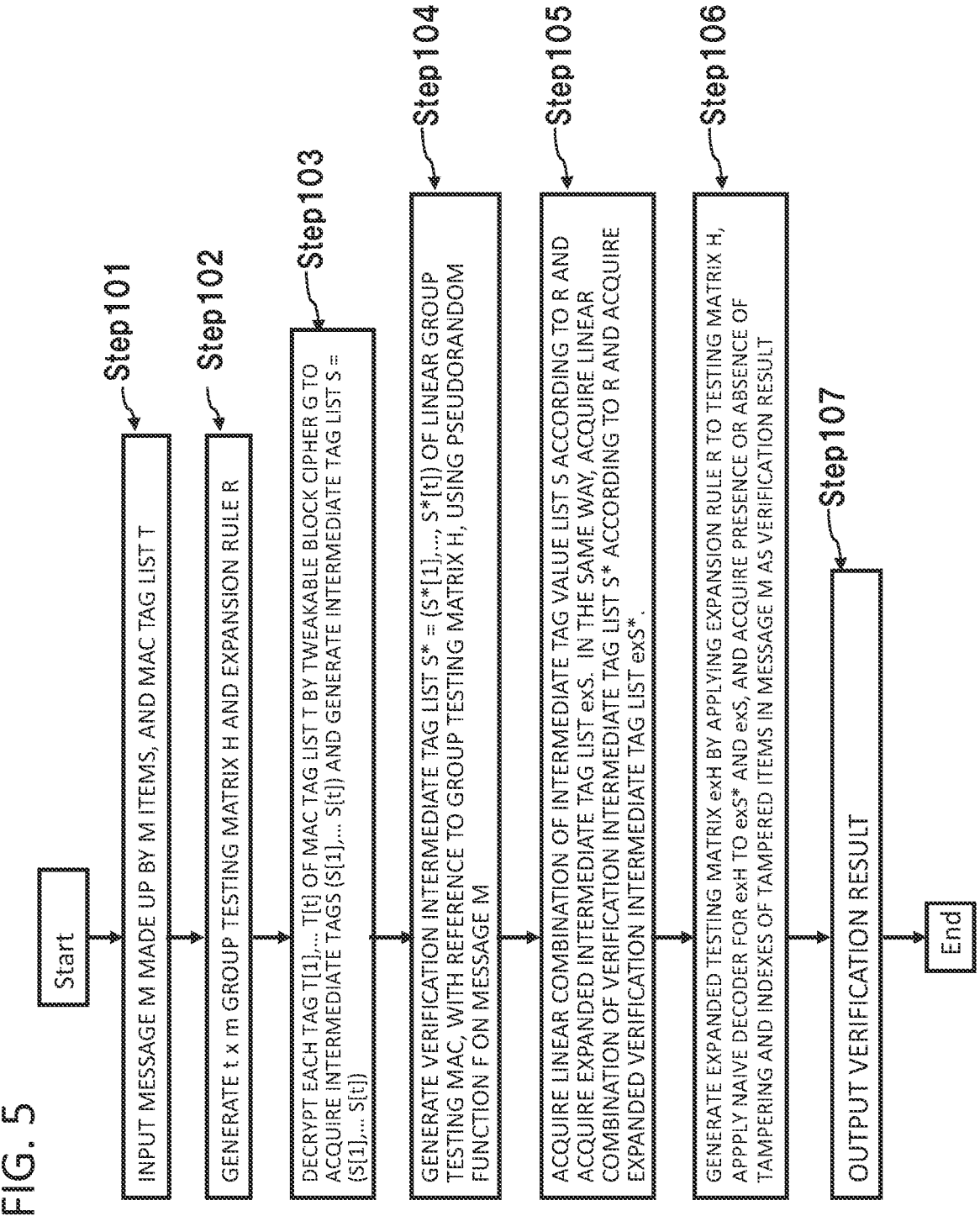
FIG. 5 is a flowchart illustrating an operation of the MAC tag list verification apparatus according to the second example embodiment of the present invention.

Next, with reference to a flow chart as shown in FIG. 5, whole operations of the second example embodiment will be described in detail. First, the message input part 201 inputs a message M made up by m items to be targets and a MAC tag list T (step 101 of FIG. 5).

Next, the group testing matrix generation and expansion part 202 generates a group testing matrix H which is a t×m binary matrix and a testing matrix expansion rule R (step 102 of FIG. 5).

Next, the tag decryption part 203 decrypts each tag $(T[1], \ldots T[t])$ of the MAC tag list T by a decryption function of the Tweakable block cipher G and acquires an intermediate tags $S[1], \ldots, S[t]$ to generate an intermediate tag list $S=(S[1], \ldots S[t])$ (step 103 of FIG. 5).

Next, the decodable linear group testing intermediate tag generation part 204, with reference to the group testing matrix H, performs intermediate tag generation of a linear group testing MAC on the message M using the pseudorandom function F, and generates a verification intermediate tag list $S^*=(S^*[1], \ldots, S^*[t])$ (step 104 of FIG. 5).

Next, the intermediate tag list expansion part 205 expands both of the MAC tag list S and the verification MAC tag list S* by performing linear combination according to the testing matrix expansion rule R to respectively generate an expanded MAC tag list exS and an expanded verification MAC tag list exS* (step 105 of FIG. 5).

Next, the intermediate tag list verification part 206 outputs an index set of tampered items in the message M by using a comparison result of element by element of the expanded MAC tag list exS and the expanded verification MAC tag list exS* and an expanded testing matrix exH which is acquired by expanding rows of the testing matrix H according to the testing matrix expansion rule R (step 106 of FIG. 5).

Finally, the verification result output part 207 outputs, as a verification result, the index set of tampered items detected by the intermediate tag list verification part 206 (step 107 of FIG. 5).

Figure 6:
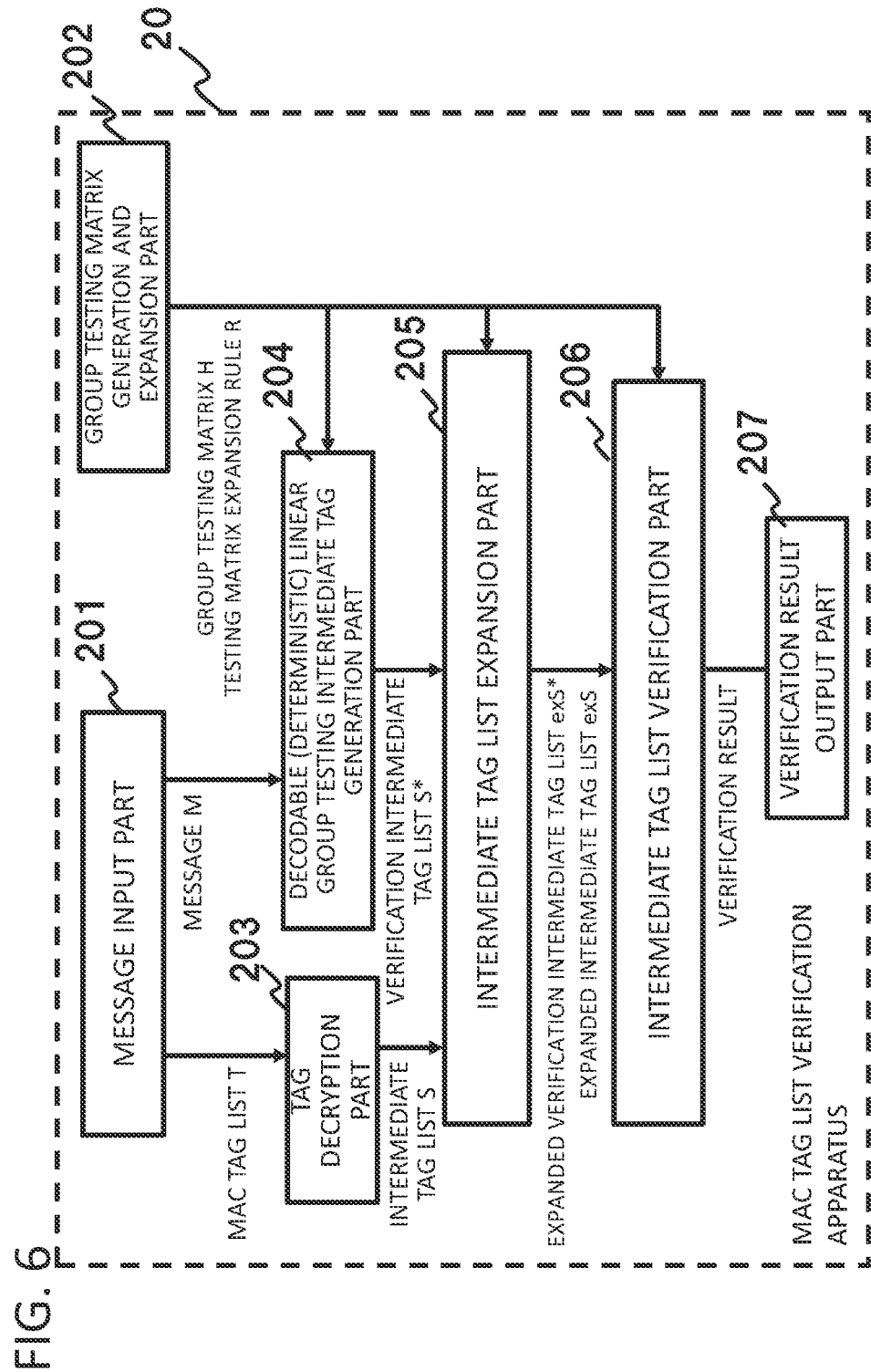
FIG. 6 is a diagram illustrating a data flow of each part of the MAC tag list verification apparatus according to the second example embodiment of the present invention.

The MAC tag list verification apparatus 20 which operates as described above can be summarized below. Hereinafter, description will be provided with reference to FIG. 6.

A message input part 201 inputs a message $M=M[1], \ldots, M[m])$ made up by m items to be a target of MAC tag list verification and a MAC tag list $T=(T[1], \ldots, T[t])$ which is a list of t MAC's.

A group testing matrix generation and expansion part 202 generates a t×m binary group testing matrix H. Furthermore, the group testing matrix generation and expansion part 202 outputs a testing matrix expansion rule R made up by v (where, v>t) elements R[i] which are subsets of row indexes of the group testing matrix H.

A tag decryption part 203 acquires a result by decrypting an element T[i] of the MAC tag list $T=(T[1], \ldots T[t])$ with a decryption function of the Tweakable block cipher G for which i is a Tweak to become an intermediate tag S[i]. The tag decryption part 203 performs calculations of intermediate tags S[i] for all $i=1, \ldots, t$ and acquires an intermediate tag list $S=(S[1], \ldots, S[t])$.

A decodable linear group testing intermediate tag generation part 204 generates, with respect to a message M, a verification intermediate tag S*[i] corresponding to an i-th $(i=1, \ldots, t)$ test using a group testing matrix H and a variable-length-input fixed-length-output pseudorandom function F. Concretely, the decodable linear group testing intermediate tag generation part 204 inputs the M[j] and the index j to the pseudorandom function F with respect to all of column indexes j $(j=1, \ldots, m)$ at which elements are 1 (one) in an i-th row of the group testing matrix H, and calculates a sum of all of obtained outputs of F to be an i-th verification intermediate tag S*[i]. The decodable linear group testing intermediate tag generation part 204 generates a verification intermediate tag list $S^*=(S^*[1], \ldots, S^*[t])$ by performing, for all $i=1, \ldots, t$, calculation of the verification intermediate tag S*[i].

An intermediate tag list expansion part 205 linearly combines S and S* respectively to correspond to subsets of row indexes designated by R using an intermediate tag list S, a verification intermediate tag list S* and a testing matrix expansion rule R and outputs an expanded intermediate MAC tag list exS and an expanded verification intermediate tag list exS*.

The intermediate tag list verification part 206 performs verification of each item in the message M and identifies a location(s) of tampering by comparing the expanded intermediate MAC tag list exS and the expanded verification intermediate tag list exS* and outputs a verification result.

Then, a verification result output part 207 outputs the verification result outputted from the intermediate tag list verification part 206.

According to the first and second example embodiments as described above, in a message authentication in which a location(s) of tampering is identified using combinatorial group testing, effect for reducing the number of tags more than that of methods of NPL 3 [GAT05], NPL 4 [Min 15], and so on can be acquired. The reason resides in that, although in NPL 3 [GAT05] and NPL 4 [Min 15], only t tags generated according to a t×m testing matrix are used for identifying a location(s) of tampering, in the first and second example embodiments, it is configured in such a manner that linear combinations of tags are also used for identifying a location(s) of tampering. In prior arts, because tags have been outputs acquired by applying a pseudorandom function to an input message, a linear combination of the tags provides no useful information.

Furthermore, in NPL 3 [GAT05] and NPL 4 [Min 15], tags have been outputs acquired by applying a pseudorandom function to an input message, a linear combination of the tags provides no useful information. On the other hand, in the first and second example embodiments, by generating tags by encrypting intermediate tag values with a decodable Tweakable block cipher, intermediate tags acquired by decrypting tags have some kinds of linearity, whereby a sum of intermediate tags can be used for a new test.

For example, in the first example embodiment, an encryption processing in which a Tweak of the Tweakable block cipher G is i and a plaintext is M is denoted by $G(i,M)$ and a decryption processing in which a Tweak is i and a ciphertext is C is denoted by $G^{-1}(i,M)$. In this case, $G^{-1}(i, G(i,M))=M$ holds for arbitrary i and M.

A Tweakable block cipher is defined in NPL 10 [LRW]. A Tweakable block cipher has additional information t called a Tweak in addition to an input/output (a plaintext M, a key K and a ciphertext C) of a normal block cipher. Encryption and decryption become possible by prescribing a pair of a key and a tweak. Unlike a key, a tweak can be public.

Next, in the first example embodiment, supposing that a first row of H is (1100 . . . 0) and a second row is (01100 . . . 0), corresponding tags become $$T[1]=G(1,S[1]), S[1]=F(M[1],1)+F(M[2],2), \text{ and}$$

$$T[2]=G(2,S[2]), S[2]=F(M[2],2)+F(M[3],3)$$

(+ indicating a bitwise exclusive OR).

Here, due to the characteristic of the exclusive OR, $$S[1]+S[2]=F(M[1],1)+F(M[3],3)$$

holds, thus a sum of intermediate tags S[1]+S[2] functions as a (practical) tag for verifying whether or not there exists tampering in (M[1], M[3]).

This is information which cannot be acquired by identification of tampering only using T[1] and T[2]. For example, in a normal verification using only T[1] and T[2], if both T[1] and T[2] fail verification, whereby two possibilities will remain, that is, as to whether M[2] is tampered with or M[1] and M[3] are tampered with, further identification is not possible. On the other hand, in the present example embodiment, S[3]=S[1]+S[2] is acquired and if S[3] passes (OK) verification, it can be identified that M[2] is tampered.

As a concrete procedure, after a verifier receives (M,T), each element of a tag list T=(T[1], T[2]) is respectively decrypted with G-1 as described below to acquire an intermediate tag list S=(S[1], S[2]):

$$S[1]=G^{-1}(1,T[1])$$

$$S[2]=G^{-1}(2,T[2])$$

In addition, from a received message M=(M[1], M[2], M[3]), an verification intermediate tag list S*=(S*[1], S*[2]) is acquired:

$$S^*[1]=F(M[1],1)+F(M[2],2)$$

$$S^*[2]=F(M[2],2)+F(M[3],3)$$

Then, a new intermediate tag S[3] and a new verification intermediate tag S*[3] are acquired:

$$S[3]=S[1]+S[2]$$

$$S^*[3]=S^*[1]+S^*[2]$$

This makes it possible to compare S[1] with S*[1], S[2] with S*[2], and S[3] with S*[3], respectively.

Furthermore, the testing matrix expansion rule R indicates which tags are to be summed and is a set whose elements are subsets of row indexes of the group testing matrix H. In the above example, it corresponds to that there is a set{1, 2} as elements of the testing matrix expansion rule R.

More generally, if a group testing matrix H described in NPL 3 [GAT05] and NPL 4 [Min 15] is used, in the first and second example embodiments, bases H_b over GF(2) of the group testing matrix H can be used.

The number of rows of H_b is the number of linearly independent rows of the original group testing matrix H (that is a rank of a matrix), and it coincides with the original number of rows at worst, reduction of the number of rows (that is reduction of the number of elements of a tag list to be transmitted) is expected.

Furthermore, practically, because the same test as that of the group testing matrix H is executable by the bases H_b over GF(2) of the group testing matrix H, ability to identify tampered items is comparable to schemes of NPL 3 [GAT05] and NPL 4 [Min 15] and so on which use the group testing matrix H.

Please note that a tag generation function used in the first and second example embodiments can be regarded as variant of XOR-MAC as described in OL 8 [BGR95]. Please note that NPL 8 [BGR95] is a proposal of a single MAC function and there is no description as to utilization of group testing and identification of tampered items.

Figure 7:
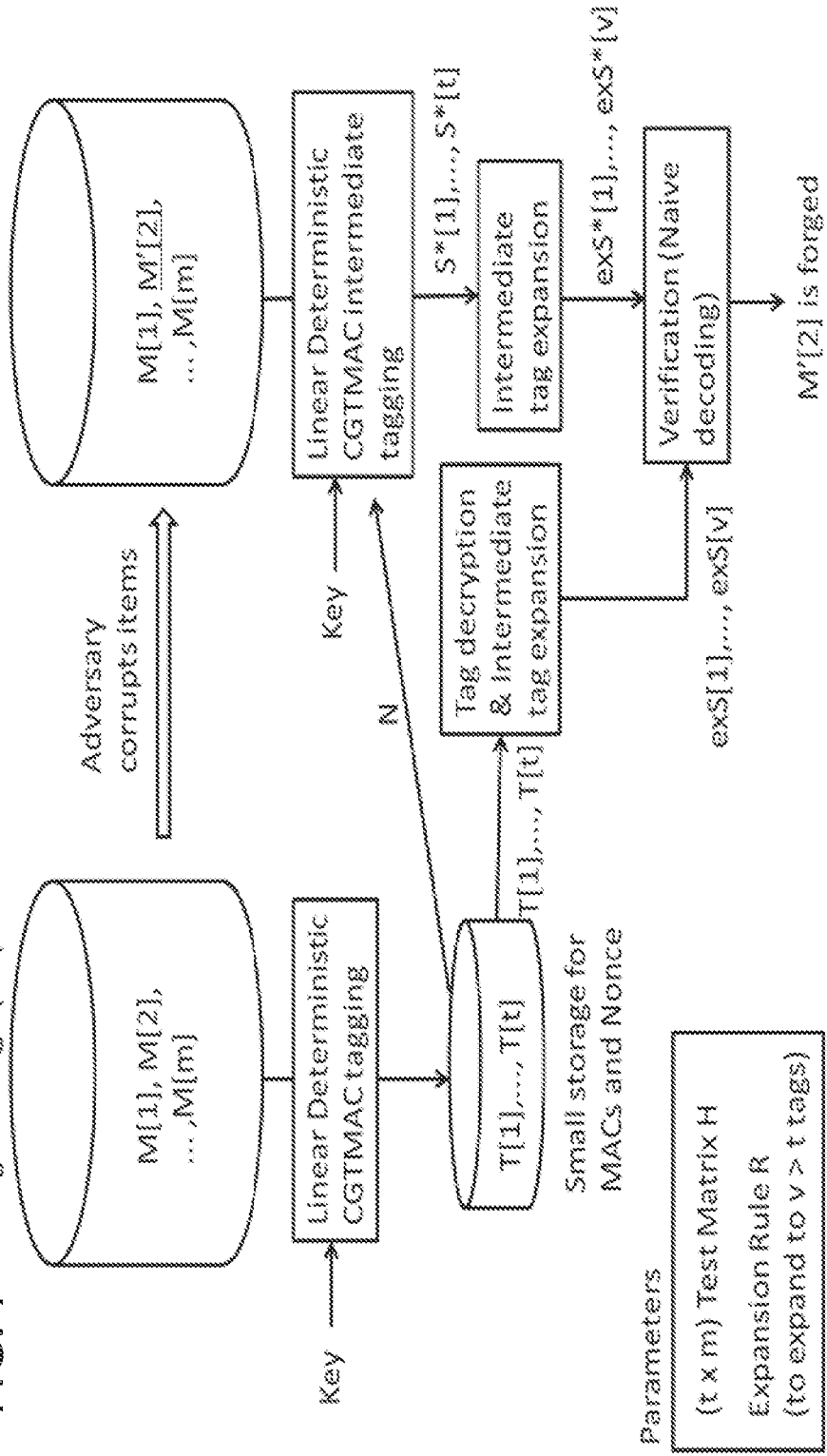
FIG. 7 is a diagram illustrating an example in which configurations of the first and second example embodiments of the present invention are applied to a storage system.

The configurations of the first and second example embodiments as described above can be preferably applied to a storage system as shown in FIG. 7. That is, with respect to a message M stored in a large-scale storage (a large storage (DB)), in a decodable linear group testing MAC application part (Linear Deterministic CGTMAC tagging), a configuration for generating a MAC tag list corresponds to a MAC tag list generation apparatus 10 of the first example embodiment. Then, as to those, a configuration in which, in the decodable linear group testing intermediate tag generation part (Linear Deterministic CGTMAC intermediate tagging), a verification intermediate tag list S* is generated, with respect to an intermediate tag list S and a verification MAC tag list S*, using respectively a testing matrix expansion rule R, an expanded MAC tag list exS and a expanded verification MAC tag list exS* are generated, and presence or absence of tampering or a location(s) of tampering is(are) identified, corresponds to the MAC tag list verification apparatus 20 of the second example embodiment.

Third Example Embodiment

Next, a third example embodiment in which a group testing matrix H of the first and second embodiments is modified will be described.

When generalizing a Macula matrix as indicated in [Example 2], it is generated as described below.

For positive integers a and b, let the number of ways for selecting b pieces from a pieces be (a,b)=a!/(a−b)!b!, and let ((a,b)) be whole of subsets each having a size of b in a set {1, 2, . . . , a}.

Then, the Macula matrix is an (n,d)×(n,k) binary matrix with respect to parameters (n, k, d), after column and row indexes are corresponded to elements of ((n,d)) and elements of ((n,k)) in a proper order, and as to elements D of ((n,d)) for elements K of ((n,k)), in which (D,K) entries of the matrix are set to 1 if D is included in K and others are set to 0.

As described in NPL 9 [M96], a Macula matrix is d-disjunct.

A matrix acquired by exchanging row indexes of a matrix as shown in [Example 2]:
[1 1 0 0]
[1 0 1 0]
[0 1 1 0]
[1 0 0 1]
[0 1 0 1]
[0 0 1 1]
corresponds to parameters (n=4, k=3, d=2) of this Macula matrix and therefore, 2-disjunct.

These bases over GF(2) make a testing matrix H. The bases over GF(2) are generally non-unique. Please note that, under row indexes according to [Example 2], an expanded testing matrix exH, a testing matrix H, and a testing matrix expansion rule R are described as described below.
the expanded testing matrix exH:
[0 1 0 1]
[0 0 1 1]
[1 1 0 0]
[1 0 1 0]
[0 1 1 0]
the testing matrix H:
[1 0 0 1]
[0 1 0 1]
[0 0 1 1]
the testing matrix expansion rule R:
The testing matrix expansion rule R describes each row the matrix of exH by sums of the rows of the testing matrix H as described below.
R=(R[1], . . . R[6]),
R[1]={1},
R[2]={2},
R[3]={3},
R[4]={1, 2},
R[5]={1, 3}, and
R[6]={2, 3}.

Therefore, it is possible to identify tampering of 2 items where the number of items m=4 and the number of tests t=3.

In this way, even if the number of rows of the Macula matrix are larger than the number of columns thereof depending on parameters, that is, there is no significance as d-disjunct matrix as it is, it is possible to make up a testing matrix which is less than the number of columns by using the bases over GF(2) thereof as described in [Example 2].

The third example embodiment can be summarized below. The group testing matrix generation part 102 of the MAC tag list generation apparatus 10 and the group testing matrix generation and expansion part 202 of the MAC tag list verification apparatus 20 described above generate the group testing matrix as prescribed below.

Concretely, a t×m group testing matrix H is made up by a Macula matrix which has positive integer parameters (n, k, d). That is, for positive integers a and b, let the number of ways for selecting b pieces from a pieces be (a,b)=a!/(a−b)!b!, and let ((a,b)) be a whole of subsets each having a size of b in a set {1, 2, . . . , a}. Then, the group testing matrix H is an (n,d)×(n,k) binary matrix, and made up by bases over a finite field GF(2) of a matrix in which, after column and row indexes are corresponded to elements of ((n,d)) and elements of ((n,k)) in a proper order, and as to elements D of ((n,d)) for elements K of ((n,k)), (D,K) entries of the matrix are set to 1 if the element D is included in the element K and others are set to 0.

Fourth Example Embodiment

Next, a fourth example embodiment in which a group testing matrix H of the first and second example embodiments as described above is modified will be described with reference to drawings.

A t×m group testing matrix H of the fourth example embodiment, for an integer r, supposing that $m=2^r-1$, and a matrix exH which is acquired by expanding the group testing matrix H with the testing matrix expansion rule R becomes to a matrix (denoted by mod Had(r)) which is acquired by removing a first row and a first column from (m+1)×(m+1) Hadamard matrix Had(r) and replacing −1 among entries made up by −1 and 1 with 0.

The group testing matrix H needs only to be selected as a submatrix (generally, there exist more than one submatrixes) which is a base of mod Had(r) and a testing matrix expansion rule R is selected in such manner that the mod Had(r) is made up by sums of rows of this submatrix. In such case, t becomes r+1.

Example 3

For example, if r=3, Had(r) becomes
[1 1 1 1 1 1 1 1]
[1 −1 1 −1 1 −1 1 −1]
[1 1 −1 −1 1 1 −1 −1]
[1 −1 −1 1 1 −1 −1 1]
[1 1 1 1 −1 −1 −1 −1]
[1 −1 1 −1 −1 1 −1 1]
[1 1 −1 −1 −1 −1 1 1]
[1 −1 −1 1 −1 1 1 −1]
and mod Had(r), that is, exH becomes
[0 1 0 1 0 1 0]
[1 0 0 1 1 0 0]
[0 0 1 1 0 0 1]
[1 1 1 0 0 0 0]
[0 1 0 0 1 0 1]
[1 0 0 0 0 1 1]
[0 0 1 0 1 1 0].
The group testing matrix H becomes one of the bases:
[0 1 0 1 0 1 0]
[1 0 0 1 1 0 0]
[0 0 1 1 0 0 1]
[1 1 1 0 0 0 0],
and corresponding testing matrix expansion rule R becomes:
({1}, {2}, {3}, {4}, {2, 3, 4}, {1, 3, 4}, {1, 2, 4}).

This expanded testing matrix exH is 2-disjunct for an arbitrary r>1, and therefore, it is possible to identify tampering of 2 items with r+1=log m+1 tags.

According to the present example embodiment, it is possible to identify tampering up to 2 items using about the number of tests of log m in this way and efficiency becomes significantly increased more than a scheme in which 2-disjunct matrix itself is used as a group testing matrix H.

The fourth example embodiment can be summarized as below. The group testing matrix generation part 102 of the MAC tag list generation apparatus 10 and the group testing matrix generation and expansion part 202 of the MAC tag list verification apparatus 20 described above generate the group testing matrix H as prescribed below.

For an integer r>1, m=$2^r$−1, and t=r are satisfied, a first row and a first column are removed from (m+1)×(m+1) Hadamard matrix Had(r), furthermore, a m×m binary matrix mod Har(r) is acquired by changing −1 among elements −1 and 1 of the Hadamard matrix to be 0, the group testing matrix H is made up by bases over a finite field GF(2) of this matrix, and a testing matrix expansion rule R is that the group testing matrix H becomes to be the mod Had(r) when rows are expanded according to the testing matrix expansion rule R.

Fifth Example Embodiment

Next, a fifth example embodiment in which a group testing matrix H of the first and second example embodiments is modified will be described.

A group testing matrix H of the fifth example embodiment is, for a positive integer s, a submatrix made up by t linearly independent row vectors of a square matrix P in which both the number of rows and the number of columns are $2^{(2s)}+2^s+1$, the square matrix P is an incidence matrix defined by all points and lines on a two dimensional projective space in which a finite field GF($2^s$) defines coordinate components, and testing vectors generated by the testing matrix expansion rule R are all of row vectors of the square matrix P.

Each row of the square matrix P corresponds to $2^{(2s)}+2^s+1$ points on the two dimensional projective space in which the finite field GF($2^s$) defines coordinate components and each column of P corresponds to $2^{(2s)}+2^s+1$ lines in the two dimensional projective space. An (i,j) element of P is set to 1 (one) only when a j-th line passes through an i-th point in the two dimensional projective space and otherwise is set to 0 (zero). The number t of linearly independent row vectors of P is t=$3^s+1$, and a ($3^s+1$)×($2^{(2s)}+2^s+1$) matrix made up by these linearly independent row vectors of P becomes a group testing matrix. The square matrix P is ($2^s$)-disjunct and it is possible to identify locations of tampering less than or equal to $2^s$ by letting whole testing vectors generated by the testing matrix expansion rule R be all of row vectors of the square matrix P.

Example 4

For example, when s=1, both the number of points and the number of lines on the two dimensional projective space in which the finite field GF(2) defines coordinate components are 7 and an incidence matrix defined by whether or not each of 7 lines passes through each of 7 points is calculated as [Equation 1] below.

$$P = \begin{pmatrix} 0 & 1 & 1 & 0 & 1 & 0 & 0 \\ 0 & 0 & 1 & 1 & 0 & 1 & 0 \\ 0 & 0 & 0 & 1 & 1 & 0 & 1 \\ 1 & 0 & 0 & 0 & 1 & 1 & 0 \\ 0 & 1 & 0 & 0 & 0 & 1 & 1 \\ 1 & 0 & 1 & 0 & 0 & 0 & 1 \\ 1 & 1 & 0 & 1 & 0 & 0 & 0 \end{pmatrix}$$ [Equation 1]

Four row vectors from a first row to a fourth row of P are linearly independent, and supposing that this 4×7 matrix made up by these four row vectors is a group testing matrix H and a testing matrix generated by a testing matrix expansion rule R is P, it is possible to identify locations of tampering less than or equal to 2 because the matrix P is 2-disjunct.

Table 1 shows sizes of testing matrixes generated according to the present example embodiment from s=1 to 13. The second column indicates the number of rows (columns) of a square matrix P, a rank and a threshold value respectively indicate a rank of P and a disjunct parameter. That is, if a rank is x and a threshold value is y, a group testing matrix H has x rows and a expanded group testing matrix H (that is $H^R$) by the testing matrix expansion rule R is y-disjunct.

TABLE 1

| s | NUMBER OF COLUMNS (=NUMBER OF ROWS) | RANK | THRESHOLD VALUE |
|---|---|---|---|
| 1 | 7 | 4 | 2 |
| 2 | 21 | 10 | 4 |
| 3 | 73 | 28 | 8 |
| 4 | 273 | 82 | 16 |
| 5 | 1,057 | 244 | 32 |
| 6 | 4,161 | 730 | 64 |
| 7 | 16,513 | 2,188 | 128 |
| 8 | 65,793 | 6,562 | 256 |
| 9 | 262,657 | 19,684 | 512 |
| 10 | 1,049,601 | 59,050 | 1,024 |
| 11 | 4,196,353 | 177,148 | 2,048 |
| 12 | 16,781,313 | 531,442 | 4,096 |
| 13 | 67,117,057 | 1,594,324 | 8,192 |

The fifth example embodiment can be summarized as below. The group testing matrix generation part 102 of the MAC tag list generation apparatus 10 and the group testing matrix generation and expansion part 202 of the MAC tag list verification apparatus 20 described above generate the group testing matrix H as prescribed below.

The group testing matrix H is, for a positive integer s, a submatrix made up by t linearly independent row vectors of a square matrix P in which both the number of rows and the number of columns are $2^{(2s)}+2^s+1$, the square matrix P is an incidence matrix defined by points and lines on a two dimensional projective space in which a finite field GF($2^s$) defines coordinate components, and testing vectors generated by the testing matrix expansion rule R are all of row vectors of the square matrix P.

Sixth Example Embodiment

Next, a sixth example embodiment in which a group testing matrix H of the first and second example embodiments is modified will be described.

The group testing matrix H of the sixth example embodiment is, for a positive integer s and an integer r which is greater than or equal to 3 and less than or equal to $2^s+1$, a submatrix made up by t linearly independent row vectors of a matrix A_r having r×($2^s$−1)+1 rows and $2^{(2s)}$−1+r columns, the matrix A_r is an incidence matrix defined by r×($2^s$−1)+1 points on r pre-designated lines which pass through the origin of a two dimensional Affine space in which a finite field GF($2^s$) defines coordinate components, and $2^{(2s)}$−1+r lines which pass through any of the points, testing vectors generated by the testing matrix expansion rule R are all row vectors of the matrix A_r.

An (i,j)-th element of A_r is set to 1 only when a j-th line in a set made up by the $2^{(2s)}$−1+r lines passes through an i-th point in a set made up by the r×($2^s$−1)+1 points of the two dimensional Affine space, and otherwise is set to 0. The number t of linearly independent row vectors of the matrix A_r is given by the following [Expression 2].

$$t = \sum_{i=0}^{\lceil \log_2 r \rceil} \binom{s}{i} 2^i + \sum_{i=\lceil \log_2 r \rceil+1}^{s} \binom{s}{i} r \quad \text{[Expression 2]}$$

A t×(2^(2S)−1+r) matrix made up by t linearly independent row vectors of the matrix A_r becomes to the group testing matrix H. The matrix A_r is (r−2)-disjunct and it is possible to identify a location(s) of tampering less than or equal to r−2 by setting whole of testing vectors generated by the testing matrix expansion rule R to whole of row vectors of the matrix A_r.

Example 5

For example, when s=2, in a two dimensional Affine plane in which a finite field GF(4) defines coordinate components, with respect to total 10 points on 3 lines passing through the origin, there are 18 lines passing through any of the points, and an incidence matrix which is determined by whether or not these lines pass through the 10 points is calculated the following [Expression 3].

$$A\_3 = \begin{pmatrix}
0 & 0 & 0 & 1 & 0 & 0 & 1 & 0 & 0 & 0 & 1 & 1 & 0 & 0 & 1 & 0 & 0 \\
0 & 0 & 0 & 0 & 1 & 0 & 0 & 1 & 0 & 1 & 0 & 0 & 0 & 1 & 0 & 1 & 0 & 0 \\
0 & 0 & 0 & 0 & 0 & 1 & 0 & 0 & 1 & 0 & 1 & 0 & 0 & 0 & 1 & 1 & 0 & 0 \\
1 & 0 & 0 & 1 & 0 & 0 & 0 & 0 & 1 & 1 & 0 & 0 & 0 & 0 & 0 & 0 & 1 & 0 \\
0 & 1 & 0 & 0 & 1 & 0 & 1 & 0 & 0 & 0 & 1 & 0 & 0 & 0 & 0 & 0 & 1 & 0 \\
0 & 0 & 1 & 0 & 0 & 1 & 0 & 1 & 0 & 0 & 0 & 1 & 0 & 0 & 0 & 0 & 1 & 0 \\
1 & 0 & 0 & 0 & 0 & 1 & 1 & 0 & 0 & 0 & 0 & 0 & 1 & 0 & 0 & 0 & 0 & 1 \\
0 & 1 & 0 & 1 & 0 & 0 & 0 & 1 & 0 & 0 & 0 & 0 & 0 & 1 & 0 & 0 & 0 & 1 \\
0 & 0 & 1 & 0 & 1 & 0 & 0 & 0 & 1 & 0 & 0 & 1 & 0 & 0 & 0 & 0 & 1 \\
0 & 0 & 0 & 0 & 0 & 0 & 0 & 0 & 0 & 0 & 0 & 0 & 0 & 0 & 1 & 1 & 1
\end{pmatrix}$$

8 row vectors from a first row to an eighth row of A_3 are linearly independent, and supposing that an 8×18 matrix made up by these 8 row vectors is a group testing matrix H and a testing matrix generated by the testing matrix expansion rule R is A_3, it is possible to identify one location of tampering by the present example embodiment because A_3 is 1-disjunct.

[Table 2] as described below shows s=1 to 13 when a size of a matrix A_r generated by the present invention is fixed to r=2^s+1. In the same way as [Table 1], a second column and a third column are the number of rows and the number of columns of A_r and a rank and a threshold value are respectively a rank and a disjunct parameter of A_r. That is, if a rank x and a threshold value y, the group testing matrix H has x rows and the testing matrix A_r (i.e., H^R) expanded by the testing matrix expansion rule R is y-disjunct.

TABLE 2

| s | NUMBER OF ROWS | NUMBER OF COLUMNS | RANK | THRESHOLD VALUE |
|---|---|---|---|---|
| 1 | 4 | 6 | 3 | 1 |
| 2 | 16 | 20 | 9 | 3 |
| 3 | 64 | 72 | 27 | 7 |
| 4 | 256 | 272 | 81 | 15 |
| 5 | 1,024 | 1,056 | 243 | 31 |
| 6 | 4,096 | 4,160 | 729 | 63 |
| 7 | 16,384 | 16,512 | 2,187 | 127 |
| 8 | 65,536 | 65,792 | 6,561 | 255 |

TABLE 2-continued

| s | NUMBER OF ROWS | NUMBER OF COLUMNS | RANK | THRESHOLD VALUE |
|---|---|---|---|---|
| 9 | 262,144 | 262,656 | 19,683 | 511 |
| 10 | 1,048,576 | 1,049,600 | 59,049 | 1,023 |
| 11 | 4,194,304 | 4,196,352 | 177,147 | 2,047 |
| 12 | 16,777,216 | 16,781,312 | 531,441 | 4,095 |
| 13 | 67,108,864 | 67,117,056 | 1,594,323 | 8,191 |

The sixth example embodiment can be summarized as below. The group testing matrix generation part 102 of the MAC tag list generation apparatus 10 and the group testing matrix generation and expansion part 202 of the MAC tag list verification apparatus 20 described above generate the group testing matrix as prescribed below.

The group testing matrix H is, for a positive integer s and an integer r which is greater than or equal to 3 and less than or equal to $2^s+1$, a submatrix made up by t linearly independent row vectors of a matrix A_r having r×($2^s-1$)+1 rows and $2^{(2s)}-1+r$ columns, the matrix A_r is an incidence matrix defined by r×($2^1-1$)+1 points on r pre-designated lines which pass through the origin of a two dimensional Affine [Expression 3] space in which a finite field GF($2^s$) defines coordinate components, and $2^{(2s)}-1+r$ lines which pass through any of the points, the testing vectors generated by the testing matrix expansion rule R are all row vectors of the matrix A_r.

Although each example embodiment of the present invention has been described above, the present invention is not limited to the example embodiments described above and further variation, replacement and adjustment can be made without departing from the basic technical concept of the present invention. For example, a configuration of an apparatus, a configuration of each element, and a representation mode of a circuit in drawings are examples for the sake of convenience to facilitate understanding of the present invention and configurations shown in the drawings are not intended to any limitation. Furthermore, in the description, "A and/or B" is used as a meaning of at least one of A or B. Furthermore, while not illustrated, a port(s) or an interface(s) exists at a connection point of an input/output of each block in the drawings.

Furthermore, procedures shown in the first to sixth example embodiments can be realized by a program which causes a computer (9000 in FIG. 11) which functions as a configuration apparatus of a MAC tag list generation apparatus 10 and a MAC tag list verification apparatus 20 to realize functions as these apparatuses. Such computer is exemplified by a configuration including a CPU (Central Processing Unit) 9010, a communication interface 9020, a memory 9030, and an auxiliary storage device 9040 of FIG. 11. That is, the CPU 9010 of FIG. 11 may execute a tag list calculation program and a tag list verification program to perform an update processing of each calculation parameter stored in the auxiliary storage device 9040.

Furthermore, in the example embodiments as described above, it is preferable that a group testing matrix H includes a row in which all the elements are 1. By using the group testing matrix H including the row in which all the elements are 1, in addition to purpose of identifying a location(s) of tampering, safety as MAC against an attacker who performs chosen-plaintext attack is assured. As a variation of the example embodiment as described above, it is possible to employ a configuration in which a group testing matrix generation part 102 or a group testing matrix generation and expansion part 202 generates a group testing matrix H which has such a row.

That is, each part of each apparatus (processing part, functions) as described in the first to sixth example embodiments can be realized by a computer program which causes a processor mounted on these apparatuses to execute each processing as described above using its hardware.

Finally, suitable modes of the present invention will be summarized.

[Mode 1]

(See the MAC tag list generation apparatus according to the above first aspect)

[Mode 2]

In the above described MAC tag list generation apparatus, for positive integers a and b, let the number of ways for selecting b pieces from a pieces be $(a,b)=a!/(a-b)!b!$, and let $((a,b))$ be whole of subsets each having the size of b in a set $\{1, 2, \ldots, a\}$, as the group testing matrix H, a Macula matrix which is an $(n,d)\times(n,k)$ binary matrix, and after column and row indexes are corresponded to elements of $((n,d))$ and elements of $((n,k))$ in a proper order, and as to an element D of $((n,d))$ for an element K of $((n,k))$, which has positive integer parameters $(n, k, d)$ and made up by bases over a finite field $GF(2)$ of a matrix in which an $(D,K)$ entry of the group testing matrix H is set to 1 if the element D is included in the element K and others are set to 0, can be used.

[Mode 3]

In the above described MAC tag list generation apparatus, it is possible that, for an integer $r>1$, $m=2^r-1$, and $t=r$ are satisfied; a first row and a first column are removed from $(m+1)\times(m+1)$ Hadamard matrix $Had(r)$ and furthermore $m\times m$ binary matrix mod $Har(r)$ is acquired by changing $-1$ among matrix elements $-1$ and $1$ to be 0, the group testing matrix H is made up by bases over a finite field $GF(2)$ of this matrix; and a testing matrix expansion rule R is that the group testing matrix H becomes to be the mod $Had(r)$ when rows are expanded according to the testing matrix expansion rule R.

[Mode 4]

In the above described MAC tag list generation apparatus, it is possible that, the group testing matrix H is, for a positive integer s, a submatrix made up by t linearly independent row vectors of a square matrix P in which both the number of rows and the number of columns are $2^{(2s)}+2^s+1$, the square matrix P is an incidence matrix defined by points and lines on a two dimensional projective space in which a finite field $GF(2^s)$ defines coordinate components, and testing vectors generated by the testing matrix expansion rule R are all of row vectors of the square matrix P.

[Mode 5]

In the above described MAC tag list generation apparatus, it is possible that, the group testing matrix H is, for a positive integer s and an integer r which is greater than or equal to 3 and less than or equal to $2^s+1$, a submatrix made up by t linearly independent row vectors of a matrix $A\_r$ having $r\times(2^s-1)+1$ rows and $2^{(2s)}-1+r$ columns, the matrix $A\_r$ is an incidence matrix defined by $r\times(2^s-1)+1$ points on r pre-designated lines which pass through the origin of a two dimensional Affine space in which a finite field $GF(2^s)$ defines coordinate components, and $2^{(2s)}-1+r$ lines which pass through any of the points, and testing vectors generated by the testing matrix expansion rule R are all row vectors of the matrix $A\_r$.

[Mode 6]

(See the MAC tag list verification apparatus according to the above second aspect)

[Mode 7]

(See the MAC tag list generation method according to the above third aspect)

[Mode 8]

(See the MAC tag list verification method according to the above fourth aspect)

A MAC tag list verification method, comprising:

inputting a message $M=(M[1], \ldots, M[m])$ made up by m items which are targets of MAC tag list verification using message authentication codes (MACs) and a MAC tag list $T=(T[1], \ldots, T[t])$ which is a list of t MACs; generating a t×m group testing matrix H and also outputting a testing matrix expansion rule R which is made up by subsets of a plurality of row indexes of the binary group testing matrix H;

acquiring an intermediate tag list $S=(S[1], \ldots, S[t])$ by performing, for all $i=1, \ldots t$, a processing in which a result of decrypting elements $T[i]$ of the MAC tag list $T=(T[1], \ldots, T[t])$ by a decryption function of a Tweakable block cipher G for which i is a Tweak becomes to be an intermediate tag $S[i]$;

generating a verification intermediate tag list $S^*= (S^*[1], \ldots, S^*[t])$ by performing, for all $i=1, \ldots, t$, a processing in which, with respect to the message M, using the group testing matrix H and a variable-length-input fixed-length-output pseudorandom function F, the verification intermediate tag $S^*[i]$ corresponding to an i-th $(i=1, \ldots t)$ test is generated in such a manner that, with respect to all of column indexes $(i=1, \ldots m)$ at which elements are 1 (one) in an i-th row of the group testing matrix H, the $M[i]$ and the index j are inputted to the pseudorandom function F, and a sum of all of acquired outputs of F are calculated to be an i-th verification intermediate tag $S^*[i]$;

outputting an expanded intermediate tag list exS and an expanded verification intermediate tag list exS* acquired by linearly combining S and S* respectively to correspond to subsets of the row indexes designated by the testing matrix expansion rule R, using the intermediate tag list S, the verification intermediate tag list S* and the testing matrix expansion rule R;

comparing the expanded intermediate tag list exS and the expanded verification intermediate tag list exS*, verifying each item in the message M, identifying a location(s) of tampering, and outputting it as a verification result; and outputting the verification result.

[Mode 9]

(See the computer program according to the above fifth aspect) A computer-readable non-transient recording medium recording a program, the program that causes a computer to execute processings, comprising:

inputting a message $M=(M[1], \ldots, M[m])$ made up by m items $M[1], \ldots, M[m]$ which are targets of message authentication codes (MACs);

generating a t×m group testing matrix H that is a parameter(s) of combinatorial group testing with respect to the number s (s being a positive integer) of the MACs to be generated;

generating a MAC tag list T=(T[1], . . . , T[t]), by performing a processing, for all of i=1, . . . , t, in which, with respect to the message M, using the group testing matrix H, a variable-length-input fixed-length-output pseudorandom function F, and a Tweakable block cipher G for which a row index of the group testing matrix H is a Tweak, for all of column indexes i (i=1, . . . , m) at which elements are 1 (one) in an i-th row of the group testing matrix H, the M[j] and the index j are inputted to the pseudorandom function F, and a sum of all of acquired outputs of the pseudorandom function F is calculated to be an i-th intermediate tag S [i], and an output acquired by encrypting the intermediate tag S[i] by a Tweakable encryption function of the Tweakable block cipher G for which the i is a Tweak is to be a tag T[i] corresponding to an i-th (i=1, . . . , t) test; and outputting the MAC tag list.

A computer-readable non-transient recording medium recording a program, the program that causes a computer to execute processings, comprising:

inputting a message M=(M[1], . . . , M[m]) made up by m items which are targets of MAC tag list verification using message authentication codes (MACs) and a MAC tag list T=(T[1], . . . , T[t]) which is a list of t MACs; generating a t×m group testing matrix H and also outputting a testing matrix expansion rule R which is made up by subsets of a plurality of row indexes of the binary group testing matrix H;

acquiring an intermediate tag list S=(S[1], . . . , S[t]) by performing, for all i=1, . . . t, a processing in which a result of decrypting elements T[i] of the MAC tag list T=(T[1], . . . , T[t]) by a decryption function of a Tweakable block cipher G for which i is a Tweak becomes to be an intermediate tag S[i];

generating a verification intermediate tag list S*= (S*[1], . . . , S*[t]) by performing, for all i=1, . . . , t, a processing in which, with respect to the message M, using the group testing matrix H and a variable-length-input fixed-length-output pseudorandom function F, the verification intermediate tag S*[i] corresponding to an i-th (i=1, . . . t) test is generated in such a manner that, with respect to all of column indexes i (i=1, . . . m) at which elements are 1 (one) in an i-th row of the group testing matrix H, the M[j] and the index j are inputted to the pseudorandom function F, and a sum of all of acquired outputs of F are calculated to be an i-th verification intermediate tag S*[i];

outputting an expanded intermediate tag list exS and an expanded verification intermediate tag list exS* acquired by linearly combining S and S* respectively to correspond to subsets of the row indexes designated by the testing matrix expansion rule R, using the intermediate tag list S, the verification intermediate tag list S* and the testing matrix expansion rule R;

comparing the expanded intermediate tag list exS and the expanded verification intermediate tag list exS*, verifying each item in the message M, identifying a location(s) of tampering, and outputting it as a verification result; and outputting the verification result.

The above modes 6 to 9 can be expanded in the same way as mode 1 is expanded to modes 2 to 5.

Please note that each disclosure of the above Patent Literatures and Non-Patent Literatures is incorporated herein by reference thereto. Variations and adjustments of the example embodiments and examples are possible within the scope of the overall disclosure (including the claims) of the present invention and based on the basic technical concept of the present invention. Various combinations and selections (including partial deletion) of various disclosed elements (including each of the elements in each of the claims, example embodiments, examples, drawings, etc.) are possible within the scope of the entire disclosure of the present invention. Namely, the present invention of course includes various variations and modifications that could be made by those skilled in the art according to the overall disclosure including the claims and the technical concept. In particular, with respect to the numerical ranges described herein, any numerical values or small range(s) included in the ranges should be construed as being expressly described even if not particularly mentioned.

INDUSTRIAL APPLICABILITY

The present invention can be applied to use of detection of tampering and identification of a location(s) of tampering in wireless or wired data communication, a database, a file system, virus scanning, or a version control system.

REFERENCE SIGNS LIST

10 MAC tag list generation apparatus
20 MAC tag list verification apparatus
101 message input part
102 group testing matrix generation part
103 decodable (deterministic) linear group testing MAC application part
104 MAC tag list output part
201 message input part
202 group testing matrix generation and expansion part
203 tag decryption part
204 decodable (deterministic) linear group testing intermediate tag generation part
205 intermediate tag list expansion part
206 intermediate tag list verification part
207 verification result output part
9000 computer
9010 CPU
9020 communication interface
9030 memory
9040 auxiliary storage device

What is claimed is:
1. A MAC tag list generation apparatus, comprising:
at least a processor; and
a memory in circuit communication with the processor,
wherein the processor is configured to execute program instructions stored in the memory to implement:
　a message input part that inputs a message M= (M[1], . . . , M[m]) made up by m items M[1], . . . , M[m] which are targets of message authentication codes (MACs);
　a group testing matrix generation part which generates a t×m group testing matrix H that is a parameter(s) of combinatorial group testing with respect to the number s (s being a positive integer) of the MACs to be generated;

a decodable linear group testing MAC application part which generates a MAC tag list T=(T[1], . . . , T[t]), by performing a processing, for all of i=1, . . . , t, in which,
with respect to the message M, using the group testing matrix H, a variable-length-input fixed-length-output pseudorandom function F, and a Tweakable block cipher G for which a row index of the group testing matrix H is a Tweak,
for all of column indexes j (j=1, . . . , m) at which elements are 1 (one) in an i-th row of the group testing matrix H, the M[j] and the index j are inputted to the pseudorandom function F, and a sum of all of acquired outputs of the pseudorandom function F is calculated to be an i-th intermediate tag S [i], and
an output acquired by encrypting the intermediate tag S[i] by a Tweakable encryption function of the Tweakable block cipher G for which the i is a Tweak is to be a tag T[i] corresponding to an i-th (i=1, . . . , t) test; and
a MAC tag list output part which outputs the MAC tag list generated by the decodable linear group testing MAC application part and which sends the output MAC tag list to an output device for verification of each item in the message M and identification of a location(s) of tampering.

2. The MAC tag list generation apparatus according to claim 1, wherein,
for positive integers a and b, let the number of ways for selecting b pieces from a pieces be (a,b)=a!/(a−b)!b!, and
let ((a,b)) be whole of subsets each having a size of b in a set {1, 2, . . . , a},
the group testing matrix H is a Macula matrix
which is an (n,d)×(n,k) binary matrix, and
after column and row indexes are corresponded to elements of ((n,d)) and elements of ((n,k)) in a proper order, and as to an element D of ((n,d)) for an element K of ((n,k)),
which has positive integer parameters (n, k, d) and made up by bases over a finite field GF(2) of a matrix in which an (D,K) entry of the group testing matrix H is set to 1 if the element D is included in the element K and others are set to 0.

3. The MAC tag list generation apparatus according to claim 1, wherein,
for an integer r>1, m=$2^r$−1, and t=r+1 are satisfied;
a first row and a first column are removed from (m+1)×(m+1) Hadamard matrix Had(r) and furthemore m×m binary matrix modHar(r) is acquired by changing −1 among matrix elements −1 and 1 to be 0, the group testing matrix H being made up by bases over a finite field GF(2) of the m×m binary matrix; and
a testing matrix expansion rule R is that the group testing matrix H becomes to be the modHad(r) when rows are expanded according to the testing matrix expansion rule R.

4. The MAC tag list generation apparatus according to claim 1, wherein,
the group testing matrix H is, for a positive integer s, a submatrix made up by t linearly independent row vectors of a square matrix P in which both the number of rows and the number of columns are $2^{(2s)}+2^s+1$, the square matrix P is an incidence matrix defined by points and lines on a two dimensional projective space in which a finite field GF($2^s$) defines coordinate components, and
testing vectors generated by the testing matrix expansion rule R are all of row vectors of the square matrix P.

5. The MAC tag list generation apparatus according to claim 1, wherein,
the group testing matrix H is, for a positive integer s and an integer r which is greater than or equalt to 3 and less than or equal to $2^s+1$, a submatrix made up by t linearly independent row vectors of a matrix A_r having r×($2^s$−1)+1 rows and $2^{(2s)}$−1+r columns,
the matrix A_r is an incidence matrix defined by r×($2^s$−1)+1 points on r pre-designated lines which pass through the origin of a two dimensional Affine space in which a finite field GF($2^s$) defines coordinate components, and $2^{(2s)}$−1+r lines which pass through any of the points, and
testing vectors generated by the testing matrix expansion rule R are all row vectors of the matrix A_r.

6. The MAC tag list generation apparatus according to claim 1, wherein
the group testing matrix generation part generates a group testing matrix H including a row in which all the elements are 1 (one).

7. A MAC tag list verification apparatus, comprising:
at least a processor; and
a memory in circuit communication with the processor, wherein the processor is configured to execute program instructions stored in the memory to implement:
a message input part that inputs a message M=(M[1], . . . , M[m]) made up by m items which are targets of MAC tag list verification using message authentication codes (MACs) and a MAC tag list T=(T[1], . . . , T[t]) which is a list oft MACs;
a group testing matrix generation and expansion part which generates a t×m group testing matrix H and also outputs a testing matrix expansion rule R which is made up by subsets of a plurality of row indexes of the binary group testing matrix H;
a tag decryption part which acquires an intermediate tag list S=(S[1], . . . , S[t]) by performing, for all i=1, . . . t, a processing in which a result of decrypting elements T[i] of the MAC tag list T=(T[1], . . . , T[t]) by a decryption function of a Tweakable block cipher G for which i is a Tweak becomes to be an intermediate tag S[i];
a decodable linear group testing intermediate tag generation part which generates a verification intermediate tag list S*=(S*[1], . . . , S*[t]) by performing, for all i=t, a processing in which, with respect to the message M, using the group testing matrix H and a variable-length-input fixed-length-output pseudorandom function F, the verification intermediate tag S*[i] corresponding to an i-th (i=1, . . . t) test is generated in such a manner that, with respect to all of column indexes j (j=1, . . . m) at which elements are 1 (one) in an i-th row of the group testing matrix H, the M[j] and the index j are inputted to the pseudorandom function F, and a sum of all of acquired outputs of F are calculated to be an i-th verification intermediate tag S*[i];
an intermediate tag list expansion part which outputs an expanded intermediate tag list exS and an expanded verification intermediate tag list exS* acquired by linearly combining S and S* respectively to correspond to subsets of the row indexes designated by the testing matrix expansion rule R, using the intermediate tag list S, the verification intermediate tag list S* and the testing matrix expansion rule R;

an intermediate tag list verification part which compares the expanded intermediate tag list exS and the expanded verification intermediate tag list exS*, verifies each item in the message M, identify a location(s) of tampering, and outputs it as a verification result; and a verification result output part which outputs the verification result outputted by the intermediate tag list verification part.

8. The MAC tag list verification apparatus according to claim 7, wherein, for positive integers a and b, let the number of ways for selecting b pieces from a pieces be $(a,b)=a!/(a-b)!b!$, and let $((a,b))$ be whole of subsets each having the size of b in a set $\{1, 2, \ldots, a\}$, the group testing matrix H is a Macula matrix which is an $(n,d)\times(n,k)$ binary matrix, and after column and row indexes are corresponded to elements of $((n,d))$ and elements of $((n,k))$ in a proper order, and as to an element D of $((n,d))$ for an element K of $((n,k))$, which has positive integer parameters (n, k, d) and made up by bases over a finite field GF(2) of a matrix in which an (D,K) entry of the group testing matrix H is set to 1 if the element D is included in the element K and others are set to 0.

9. The MAC tag list verification apparatus according to claim 7, wherein, the group testing matrix H is configured such that:

a first row and a first column are removed from $(m+1)\times(m+1)$ Hadamard matrix Had(r) and furthemore m×m binary matrix modHar(r) is acquired by changing −1 among matrix elements −1 and 1 to be 0, the group testing matrix H being made up by bases over a finite field GF(2) of the m×m binary matrix; and the testing matrix expansion rule R is configured such that the group testing matrix H becomes to be the modHad(r) when rows are expanded according to the testing matrix expansion rule R.

10. The MAC tag list verification apparatus according to claim 7, wherein, the group testing matrix H is a submatrix made up by t linearly independent row vectors of a square matrix P in which both the number of rows and the number of columns are $2^{(2s)}+2^s+1$, for a positive integer s, the square matrix P is an incidence matrix defined by points and lines on a two dimensional projective space in which a finite field $GF(2^s)$ defines coordinate components, and testing vectors generated by the testing matrix expansion rule R are all of row vectors of the square matrix P.

11. The MAC tag list verification apparatus according to claim 7, wherein, the group testing matrix H is, for a positive integer s and an integer r which is greater than or equalt to 3 and less than or equal to $2^S+1$, a submatrix made up by t linearly independent row vectors of a matrix A_r having r×$(2^s-1)+1$ rows and $2^{(2s)}-1+r$ columns, the matrix A_r is an incidence matrix defined by r×$(2^s-1)+1$ points on r pre-designated lines which pass through the origin of a two dimensional Affine space in which a finite field $GF(2^s)$ defines coordinate components, and $2^{(2s)}-1+r$ lines which pass through any of the points, and testing vectors generated by the testing matrix expansion rule R are all row vectors of the matrix A_r.

12. The MAC tag list verification apparatus according to claim 7, wherein the group testing matrix generation and expansion part generates a group testing matrix H including a row in which all elements are 1 (one).

13. A MAC tag list generation method, comprising:

inputting a message $M=(M[1], \ldots, M[m])$ made up by m items $M[1], \ldots, M[m]$ which are targets of message authentication codes (MACs);

generating at t×m group testing matrix H that is a parameter(s) of combinatorial group testing with respect to the number s (s being a positive integer) of the MACs to be generated;

generating a MAC tag list $T=(T[1], \ldots, T[t])$, by performing a processing, for all of $i=1, \ldots, t$, in which, with respect to the message M, using the group testing matrix H, a variable-length-input fixed-length-output pseudorandom function F, and a Tweakable block cipher G for which a row index of the group testing matrix H is a Tweak, for all of column indexes j ($j=1, \ldots, m$) at which elements are 1 (one) in an i-th row of the group testing matrix H, the M[j] and the index j are inputted to the pseudorandom function F, and a sum of all of acquired outputs of the pseudorandom function F is calculated to be an i-th intermediate tag S [i], and an output acquired by encrypting the intermediate tag S[i] by a Tweakable encryption function of the Tweakable block cipher G for which the i is a Tweak is to be a tag T[i] corresponding to an i-th (i=t) test;

outputting the MAC tag list; and sending the output MAC tag list to an output device for verification of each item in the message M and identification of a location(s) of tampering.

14. The MAC tag list generation method according to claim 13, wherein, for positive integers a and b, let the number of ways for selecting b pieces from a pieces be $(a,b)=a!/(a-b)!b!$, and let $((a,b))$ be whole of subsets each having a size of b in a set $\{1, 2, \ldots, a\}$, the group testing matrix H is a Macula matrix which is an $(n,d)\times(n,k)$ binary matrix, and after column and row indexes are corresponded to elements of $((n,d))$ and elements of $((n,k))$ in a proper order, and as to an element D of $((n,d))$ for an element K of $((n,k))$, which has positive integer parameters (n, k, d) and made up by bases over a finite field GF(2) of a matrix in which an (D,K) entry of the group testing matrix H is set to 1 if the element D is included in the element K and others are set to 0.

15. The MAC tag list generation method according to claim 13, wherein, for an integer r>1, $m=2^r-1$, and $t=r+1$ are satisfied;

a first row and a first column are removed from $(m+1)\times(m+1)$ Hadamard matrix Had(r) and furthemore m×m binary matrix modHar(r) is acquired by changing −1 among matrix elements −1 and 1 to be 0, the group testing matrix H being made up by bases over a finite field GF(2) of the m×m binary matrix; and a testing matrix expansion rule R is that the group testing matrix H becomes to be the modHad(r) when rows are expanded according to the testing matrix expansion rule R.

16. The MAC tag list generation method according to claim 13, wherein,
   the group testing matrix H is, for a positive integer s, a submatrix made up by t linearly independent row vectors of a square matrix P in which both the number of rows and the number of columns are $2^{(2s)}+2^s+1$,
   the square matrix P is an incidence matrix defined by points and lines on a two dimensional projective space in which a finite field $GF(2^s)$ defines coordinate components, and
   testing vectors generated by the testing matrix expansion rule R are all of row vectors of the square matrix P.

17. The MAC tag list generation method according to claim 13, wherein,
   the group testing matrix H is, for a positive integer s and an integer r which is greater than or equalt to 3 and less than or equal to $2^s+1$, a submatrix made up by t linearly independent row vectors of a matrix A_r having r× $(2^s-1)+1$ rows and $2^{(2s)}-1+r$ columns,
   the matrix A_r is an incidence matrix defined by r× $(2^s-1)+1$ points on r pre-designated lines which pass through the origin of a two dimensional Affine space in which a finite field $GF(2^s)$ defines coordinate components, and $2^{(2s)}-1+r$ lines which pass through any of the points, and
   testing vectors generated by the testing matrix expansion rule R are all row vectors of the matrix A_r.

18. The MAC tag list generation method according to claim 13, wherein
   the generating the t×m group testing matrix H comprises generating a group testing matrix H including a row in which all the elements are 1 (one).

* * * * *